US012251931B2

(12) United States Patent
Kosugi

(10) Patent No.: US 12,251,931 B2
(45) Date of Patent: Mar. 18, 2025

(54) LIQUID EJECTING APPARATUS

(71) Applicant: SEIKO EPSON CORPORATION, Tokyo (JP)

(72) Inventor: Yasuhiko Kosugi, Nagano (JP)

(73) Assignee: Seiko Epson Corporation, Tokyo (JP)

(*) Notice: Subject to any disclaimer, the term of this patent is extended or adjusted under 35 U.S.C. 154(b) by 148 days.

(21) Appl. No.: 18/171,697

(22) Filed: Feb. 21, 2023

(65) Prior Publication Data

US 2023/0264472 A1 Aug. 24, 2023

(30) Foreign Application Priority Data

Feb. 22, 2022 (JP) ................................ 2022-025378

(51) Int. Cl.
*B41J 2/045* (2006.01)

(52) U.S. Cl.
CPC ................................ *B41J 2/04555* (2013.01)

(58) Field of Classification Search
CPC .................................................... B41J 2/04555
See application file for complete search history.

(56) References Cited

U.S. PATENT DOCUMENTS 4,289,977 A * 9/1981 Powers ............ H03K 19/00307 326/89
10,008,656 B1 * 6/2018 Radhakrishnan ....... H03F 3/303
2010/0079553 A1 * 4/2010 Katoh .................. B41J 2/04555 310/317
2010/0118075 A1 5/2010 Miyazawa et al.

FOREIGN PATENT DOCUMENTS

JP 2004090500 A * 3/2004 ............ B41J 2/0451
JP 2010-115847 A 5/2010

* cited by examiner

*Primary Examiner* — Sharon Polk
(74) *Attorney, Agent, or Firm* — Global IP Counselors, LLP

(57) ABSTRACT

A liquid ejecting apparatus includes a driven element that is driven by a drive signal; an ejection head that ejects a liquid when the driven element is driven; a drive circuit that outputs the drive signal, the drive circuit including an amplifier circuit that includes a first transistor and amplifies, based on an amplification voltage and through an operation of the first transistor, a base drive signal based on which the drive signal is generated; and a leakage current detection circuit that detects a leakage current in the drive circuit. The leakage current detection circuit is electrically connected to the first transistor included in the amplifier circuit to which the amplification voltage is supplied.

8 Claims, 15 Drawing Sheets

| | | LD | MD | SD | ND |
|---|---|---|---|---|---|
| [SIH, SIL] | | [1, 1] | [1, 0] | [0, 1] | [0, 0] |
| S | T1 | H | H | L | L |
| | T2 | H | L | H | L |
| | T3 | L | L | L | H |

LIQUID EJECTING APPARATUS

The present application is based on, and claims priority from JP Application Serial Number 2022-025378, filed Feb. 22, 2022, the disclosure of which is hereby incorporated by reference herein in its entirety.

BACKGROUND

1. Technical Field

The present disclosure relates to a liquid ejecting apparatus.

2. Related Art

A known liquid ejecting apparatus for forming desired characters and images on a medium by ejecting a liquid has a configuration in which the liquid is ejected by driving a driven element such as a piezoelectric element. The piezoelectric element is provided for each of multiple nozzles that eject ink and is driven at a timing when a drive signal is supplied. When the piezoelectric element is driven, a predetermined amount of ink is ejected from the corresponding nozzle. In an electrical sense, a piezoelectric element used as a driven element is a capacitive load like a capacitor, and to drive the piezoelectric element, a sufficient amount of electric current needs to be supplied to the piezoelectric element. Accordingly, in a liquid ejecting apparatus, a drive circuit for driving a piezoelectric element needs to output a drive signal with a sufficient electric current to the piezoelectric element and includes, for example, an amplifier circuit.

For example, JP-A-2010-115847 describes a liquid discharging apparatus (liquid ejecting apparatus) including a drive signal generating circuit (drive circuit) that outputs a drive signal to be supplied to a piezoelectric element by amplifying an analog signal based on digital waveform information.

Because a drive circuit as described in JP-A-2010-115847 generates a drive signal by amplifying a signal, which is based on waveform information, based on a high voltage signal, a leakage current based on the high voltage signal may be generated. Such a leakage current may cause unintended heat generation in a liquid ejecting apparatus including a drive circuit and, as a result, may decrease the operational stability of the liquid ejecting apparatus. However, JP-A-2010-115847 includes no description about a leakage current that may be generated in the drive circuit, and there is a room for improvement in terms of improving the operational stability of the liquid ejecting apparatus.

SUMMARY

A liquid ejecting apparatus according to an aspect of this disclosure includes a driven element that is driven by a drive signal; an ejection head that ejects a liquid when the driven element is driven; a drive circuit that outputs the drive signal, the drive circuit including an amplifier circuit that includes a first transistor and amplifies, based on an amplification voltage and through an operation of the first transistor, a base drive signal based on which the drive signal is generated; and a leakage current detection circuit that detects a leakage current in the drive circuit. The leakage current detection circuit is electrically connected to the first transistor included in the amplifier circuit to which the amplification voltage is supplied.

DESCRIPTION OF EXEMPLARY EMBODIMENTS

Embodiments of the present disclosure are described below with reference to the accompanying drawings. The drawings are just for descriptive purposes. The embodiments described below do not unduly limit the scope of the present disclosure described in the claims. Also, not all of the configurations described below are necessarily essential components of the present disclosure.

1. Configuration of Liquid Ejecting Apparatus

Figure 1:
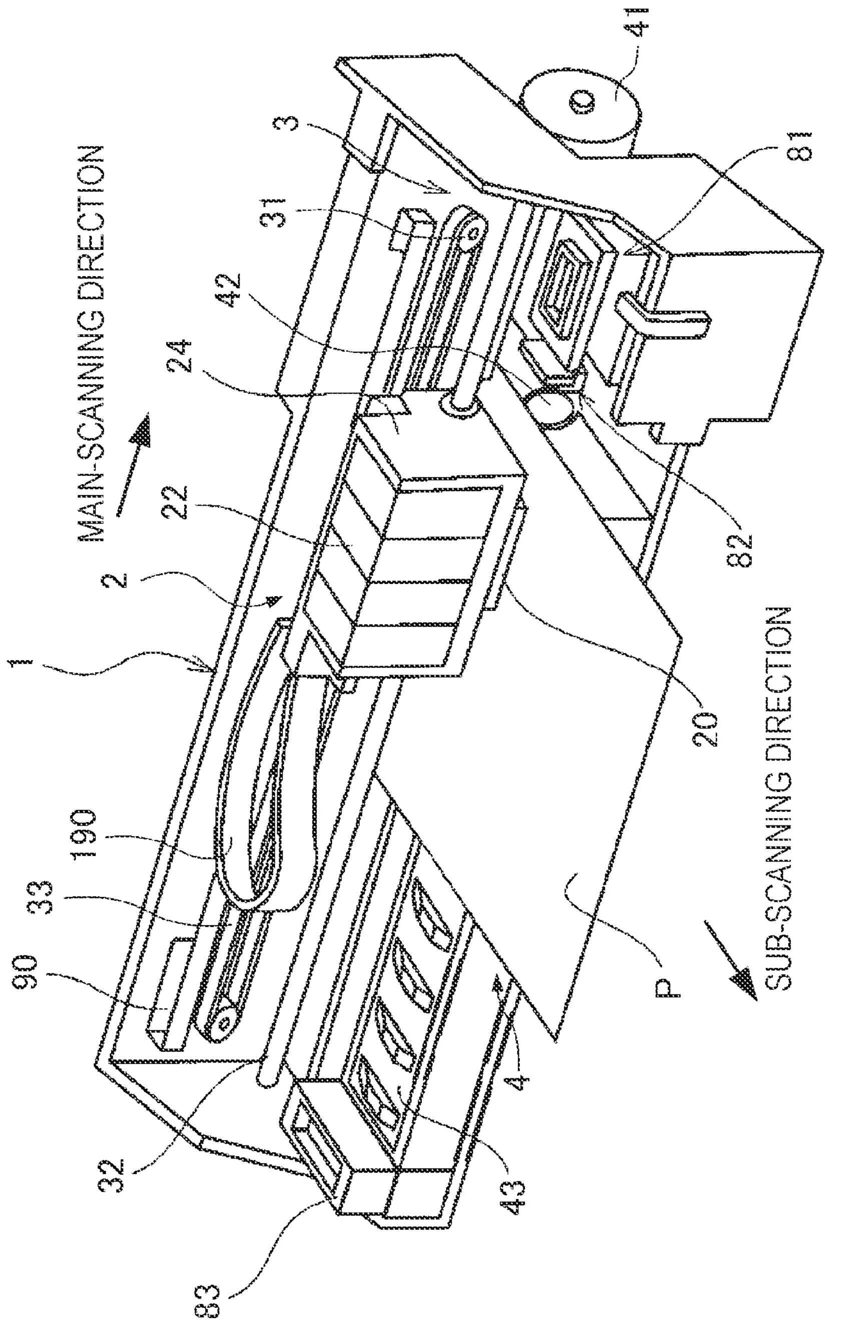
FIG. 1 is a drawing illustrating a schematic configuration of a liquid ejecting apparatus.

FIG. 1 is a drawing illustrating a schematic configuration of a liquid ejecting apparatus 1 according to the present embodiment. The liquid ejecting apparatus 1 of the present embodiment is, for example, an ink jet printer that ejects ink, which is an example of a liquid, according to image data supplied from an external host computer and thereby forms an image corresponding to the image data on a medium P such as paper. Here, the liquid ejecting apparatus 1 is not limited to an ink jet printer, but may also be, for example, a color material ejecting apparatus used to manufacture a color filter for a liquid crystal display, an electrode material ejecting apparatus used to form electrodes for an organic electroluminescent (EL) display and a surface-emitting display, or a bioorganic material ejecting apparatus used to manufacture a biochip.

As illustrated in FIG. 1, the liquid ejecting apparatus 1 includes a head unit 2, a moving mechanism 3, and a conveying mechanism 4. In FIG. 1, some components of the liquid ejecting apparatus 1, such as a housing and a cover, are omitted.

The head unit 2 includes an ejection head 20 and a carriage 24. The carriage 24 is configured to hold a predetermined number of ink cartridges 22 that store inks to be ejected from the ejection head 20. Also, the ejection head 20 includes multiple nozzles described later. The nozzles are attached to the carriage 24 so as to face the medium P. The ejection head 20 ejects a predetermined amount of ink from each nozzle at a timing determined by various control signals supplied via a cable 190 such as a flexible flat cable.

The moving mechanism 3 moves the carriage 24 of the head unit 2 back and forth along a main-scanning direction. The moving mechanism 3 includes a carriage motor 31, a carriage guide shaft 32, a timing belt 33, and a linear encoder 90. The carriage guide shaft 32 is fixed at both ends to the housing of the liquid ejecting apparatus 1 and supports the carriage 24 such that the carriage 24 is movable back and forth. The timing belt 33 extends approximately parallel to the carriage guide shaft 32, and a part of the timing belt 33 is fixed to the carriage 24. The carriage motor 31 supplies a driving force to the timing belt 33. With this configuration, when the carriage motor 31 rotates the timing belt 33 forward and backward, the carriage 24 fixed to the timing belt 33 is guided by the carriage guide shaft 32 to move back and forth along the main-scanning direction. That is, the moving mechanism 3 moves the carriage 24 back and forth along the main-scanning direction.

Also, the linear encoder 90 detects the scanning position of the carriage 24 in the main-scanning direction and outputs the detected scanning position as a detection signal. Based on information on the scanning position of the carriage 24 output by the linear encoder 90, the liquid ejecting apparatus 1 controls the output of the carriage motor 31 and thereby controls the scanning position of the ejection head 20 along the main-scanning direction.

The conveying mechanism 4 conveys the medium P along the sub-scanning direction that intersects the main-scanning direction along which the carriage 24 moves back and forth. The conveying mechanism 4 includes a conveying motor 41, a conveyor roller 42, and a platen 43. The conveying motor 41 supplies a driving force to the conveyor roller 42. As a result, the conveyor roller 42 rotates. The rotation of the conveyor roller 42 conveys the medium P along the sub-scanning direction. While being conveyed, the medium P is supported by the platen 43. That is, the platen 43 guides the medium P, which is being conveyed by the conveyor roller 42, along the sub-scanning direction.

Also, as illustrated in FIG. 1, the liquid ejecting apparatus 1 includes a capping part 81, a wiping part 82, and a flushing box 83. The capping part 81 and the wiping part 82 are located at one end of the moving range of the carriage 24 and are provided at the home position from which the carriage 24 starts moving. The capping part 81 covers a nozzle forming surface of the ejection head 20, and the wiping part 82 wipes the nozzle forming surface. On the other hand, the flushing box 83 is provided at another end of the platen 43 in the main-scanning direction, i.e., at an end that is located opposite the home position from which the carriage 24 starts moving. The flushing box 83 receives ink ejected from the ejection head 20 during a flushing operation. Here, the flushing operation indicates forcibly ejecting ink from the nozzles with no relation to image data to reduce the probability that a proper amount of ink cannot be ejected from the nozzles due to clogging of the nozzles, which results from thickening of ink near the nozzles, or entry of bubbles into the nozzles.

In the liquid ejecting apparatus 1 configured as described above, the medium P is conveyed in the sub-scanning direction while being supported by the platen 43, and the carriage 24 moves back and forth along the main-scanning direction in synchronization with the timing of conveyance of the medium P. Then, in synchronization with the conveyance of the medium P and the movement of the carriage 24, the ejection head 20 attached to the carriage 24 ejects ink. This configuration makes it possible to cause ink to land in desired positions on the medium P and thereby makes it possible to form a desired image on the medium P. In the descriptions below, the sub-scanning direction in which the medium P is conveyed may be referred to as a conveying direction.

2. Functional Configuration of Liquid Ejecting Apparatus

Figure 2A:
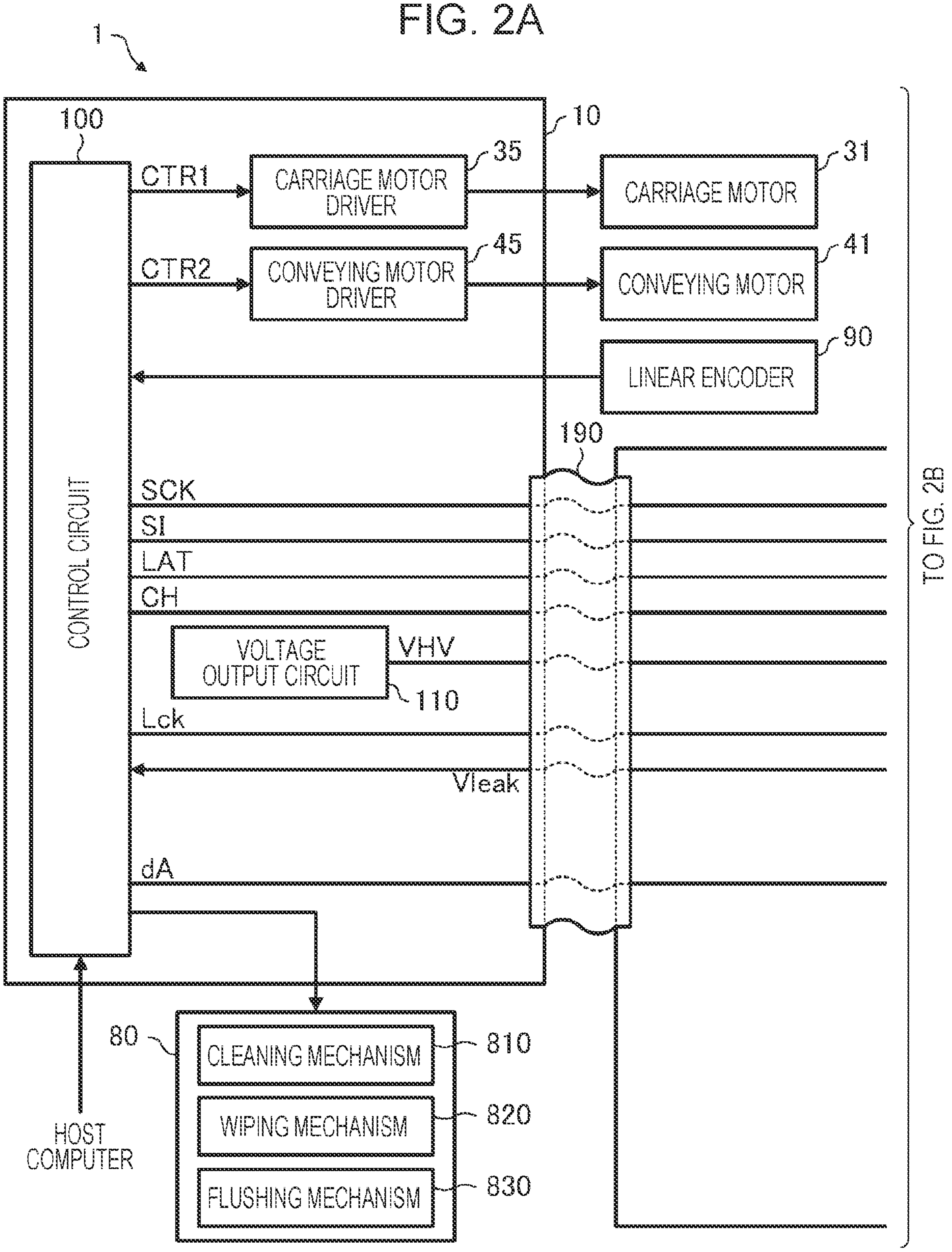
FIGS. 2A and 2B are drawings illustrating a functional configuration of the liquid ejecting apparatus.
Figure 2B:
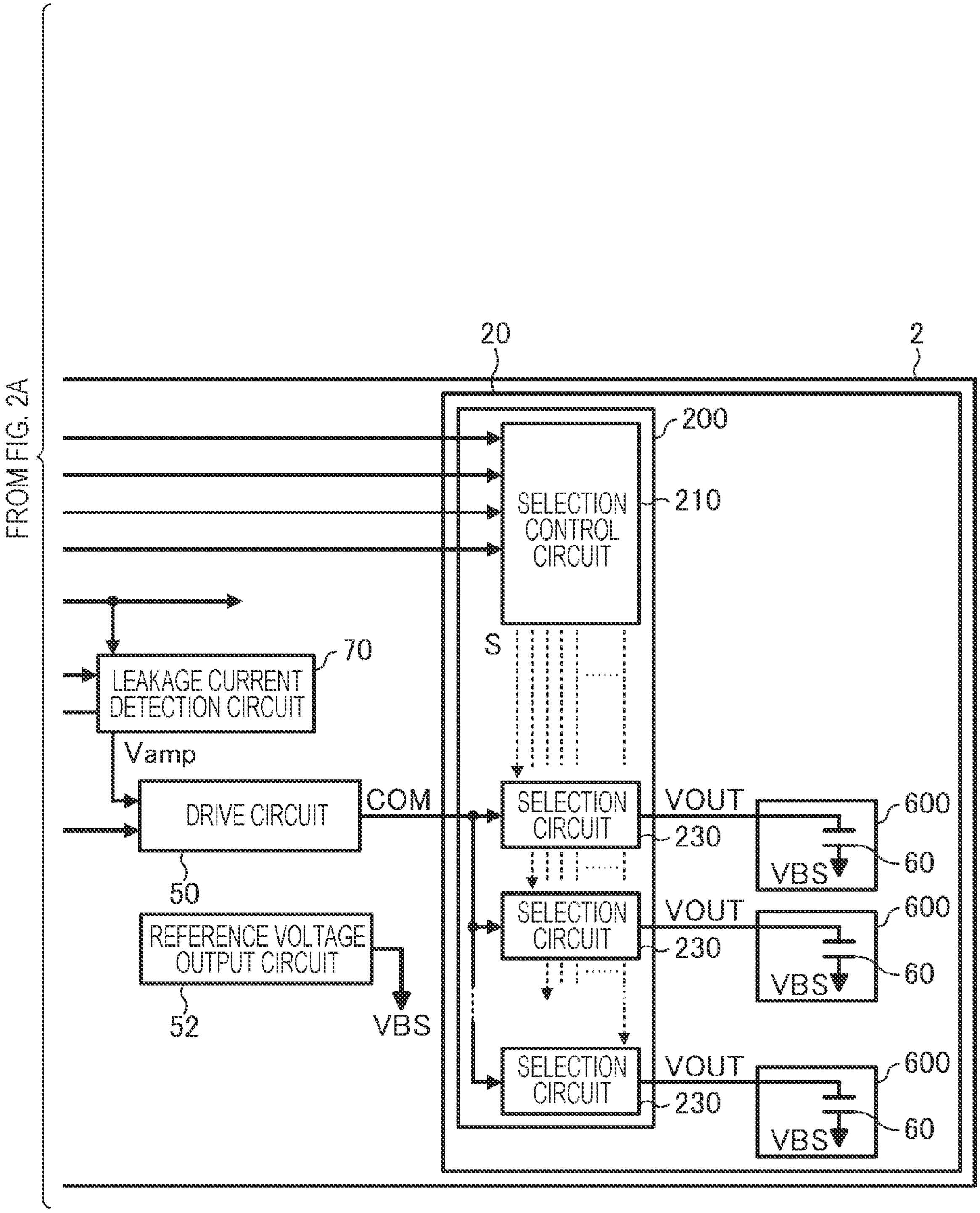

Next, a functional configuration of the liquid ejecting apparatus 1 is described. FIGS. 2A and 2B are drawings illustrating a functional configuration of the liquid ejecting apparatus 1. As illustrated in FIGS. 2A and 2B, the liquid ejecting apparatus 1 includes a control unit 10 and a head unit 2. The control unit 10 and the head unit 2 are electrically connected to each other via the cable 190.

The control unit 10 includes a control circuit 100, a carriage motor driver 35, a conveying motor driver 45, and a voltage output circuit 110.

The control circuit 100 is supplied with image data from a host computer provided outside of the liquid ejecting apparatus 1. The control circuit 100 generates various control signals according to the supplied image data and outputs the control signals to components of the liquid ejecting apparatus 1.

Specifically, the control circuit 100 determines the current scanning position of the head unit 2 based on a detection signal output by the linear encoder 90. Then, the control circuit 100 generates control signals CTR1 and CTR2 according to the current scanning position of the head unit 2. The control signal CTR1 is supplied to the carriage motor driver 35. The carriage motor driver 35 drives the carriage motor 31 according to the supplied control signal CTR1. Also, the control signal CTR2 is supplied to the conveying motor driver 45. The conveying motor driver 45 drives the conveying motor 41 according to the supplied control signal CTR2. Thus, the control circuit 100 controls the back-and-forth movement of the carriage 24 in the main-scanning direction and the conveyance of the medium P in the sub-scanning direction.

Also, the control circuit 100 generates a clock signal SCK, a print data signal SI, a latch signal LAT, a change signal CH, a base drive signal dA, and a detection control signal Lck based on image data supplied from the host computer and a detection signal output by the linear encoder 90, and outputs the generated signals to the head unit 2.

Furthermore, the control circuit 100 causes a maintenance unit 80 to perform a maintenance process for restoring the ink ejection state of the ejection unit 600 to normal. The maintenance unit 80 includes a cleaning mechanism 810, a wiping mechanism 820, and a flushing mechanism 830. The cleaning mechanism 810 performs, as a maintenance process, a pumping process in which thickened ink, air bubbles, and so on accumulated inside of the ejection unit 600 are sucked out by a tube pump (not shown). The wiping mechanism 820 performs, as a maintenance process, a wiping process in which a foreign matter such as paper dust adhering to the vicinity of the nozzles of the ejection unit 600 is wiped off by the wiping part 82. The flushing mechanism 830 performs a flushing operation for restoring the ink ejection state of the ejection unit 600 to normal.

The voltage output circuit 110 generates a voltage signal VHV with a potential Vh and outputs the voltage signal VHV to the head unit 2. The voltage signal VHV is used, for example, as a power-supply voltage for components of the head unit 2. The voltage signal VHV generated by the voltage output circuit 110 may also be used as a power-supply voltage for components of the control unit 10. The voltage signal VHV is, for example, a direct-current voltage of 42 V. The voltage output circuit 110 may also be configured to generate, in addition to the voltage signal VHV, a direct-current voltage signal with a voltage value of, for example, 3.3 V or 7.5 V that is different from the voltage value of the voltage signal VHV and to supply the direct-current voltage signal to components included in the control unit 10 and the head unit 2.

The head unit 2 includes a drive circuit 50, a reference voltage output circuit 52, a leakage current detection circuit 70, and an ejection head 20.

The leakage current detection circuit 70 receives the voltage signal VHV output by the voltage output circuit 110 and the detection control signal Lck output by the control circuit 100. The leakage current detection circuit 70 outputs the voltage signal VHV passing through the leakage current detection circuit 70 to the drive circuit 50 as a voltage signal Vamp. That is, the leakage current detection circuit 70 is provided in a transmission path through which the voltage signal VHV output by the voltage output circuit 110 is transmitted to the drive circuit 50 as the voltage signal Vamp.

Also, the leakage current detection circuit 70 detects a leakage current, which may be generated in the drive circuit 50, based on the variation of the voltage value of the voltage signal Vamp passing through the leakage current detection circuit 70. Then, the leakage current detection circuit 70 generates a detection voltage Vleak with a voltage value corresponding to the detected leakage current and outputs the detection voltage Vleak to the control circuit 100. The detection control signal Lck input to the leakage current detection circuit 70 indicates whether it is necessary to detect a leakage current that may be generated in the drive circuit 50. That is, the leakage current detection circuit 70 determines whether to detect a leakage current that may be generated in the drive circuit 50 based on the detection control signal Lck input from the control circuit 100.

The drive circuit 50 receives the digital base drive signal dA output by the control circuit 100 and the voltage signal Vamp output by the leakage current detection circuit 70. Then, the drive circuit 50 converts the received digital base drive signal dA into an analog signal and generates a drive signal COM by amplifying the analog signal according to the voltage signal VHV. Then, the drive circuit 50 outputs the generated drive signal COM to the ejection head 20. Here, the base drive signal dA defines the waveform of the drive signal COM and may be an analog signal.

The reference voltage output circuit 52 generates a reference voltage signal VBS with a constant voltage value of, for example, 5.5 V or 6 V, and supplies the reference voltage signal VBS to the ejection head 20. The reference voltage signal VBS output by the reference voltage output circuit 52 serves as a reference potential for driving a piezoelectric element 60 described later. Alternatively, the reference voltage signal VBS may have a ground potential.

The ejection head 20 includes a drive signal selection circuit 200 and n ejection units 600. The drive signal selection circuit 200 includes a selection control circuit 210 and n selection circuits 230 corresponding to the n ejection units 600.

The selection control circuit 210 receives the clock signal SCK, the print data signal SI, the latch signal LAT, and the change signal CH output by the control circuit 100. The selection control circuit 210 generates selection signals S corresponding to the n selection circuits 230 based on the clock signal SCK, the print data signal SI, the latch signal LAT, and the change signal CH and outputs the selection signals S to the corresponding selection circuits 230.

Each of the n selection circuits 230 receives the drive signal COM and the corresponding selection signals S. The selection circuit 230 generates a drive signal VOUT by selecting or deselecting signal waveforms in the drive signal COM based on the received selection signals S. Then, the selection circuit 230 outputs the generated drive signal VOUT to the corresponding ejection unit 600.

Each of the n ejection units 600 includes a piezoelectric element 60. The drive signal VOUT output by the corresponding selection circuit 230 is supplied to one end of the piezoelectric element 60. Also, the reference voltage signal VBS output by the reference voltage output circuit 52 is supplied to another end of the piezoelectric element 60. The piezoelectric element 60 is driven according to the potential difference between the drive signal VOUT supplied to one end and the reference voltage signal VBS supplied to the other end. An amount of ink corresponding to the driving of the piezoelectric element 60 is ejected from the corresponding ejection unit 600.

3. Configurations and Operations of Ejection Head

Figure 3:
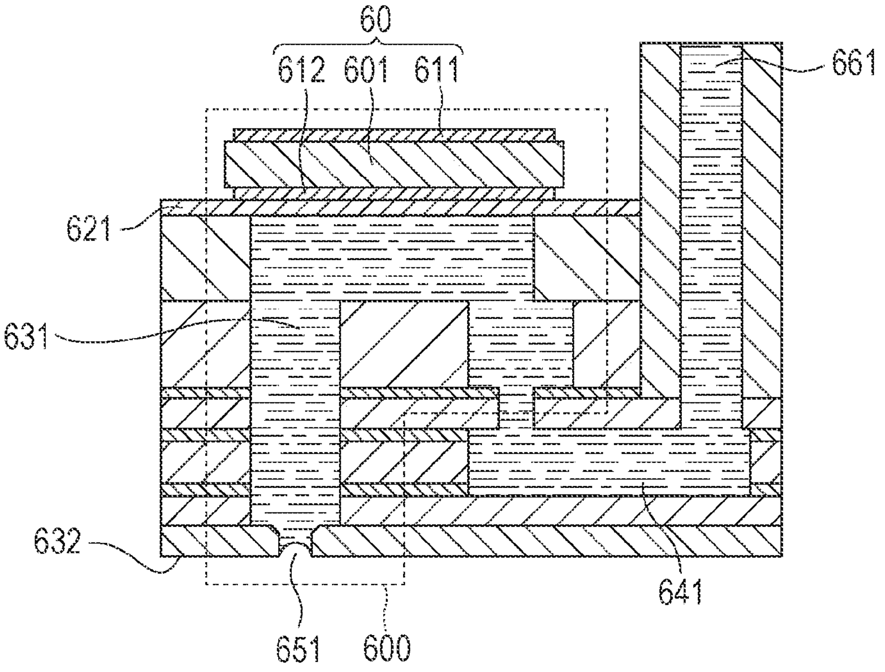
FIG. 3 is a drawing illustrating a schematic configuration of an ejection unit.

Next, configurations and operations of the ejection head 20 are described. First, a configuration of the ejection unit 600 of the ejection head 20 is described. FIG. 3 is a drawing illustrating a schematic configuration of the ejection unit 600. In addition to the ejection unit 600, FIG. 3 illustrates a reservoir 641 and a supply port 661.

As illustrated in FIG. 3, the ejection unit 600 includes the piezoelectric element 60, a vibration plate 621, a cavity 631, and a nozzle plate 632.

The piezoelectric element 60 includes a piezoelectric body 601 and electrodes 611 and 612. In the piezoelectric element 60, the electrodes 611 and 612 are disposed to sandwich the piezoelectric body 601. The piezoelectric element 60 configured as described above is driven such that the central portion of the piezoelectric body 601 is displaced in the vertical direction according to the potential difference between a voltage supplied to the electrode 611 and a voltage supplied to the electrode 612. In the piezoelectric element 60 of the present embodiment, the drive signal VOUT based on the drive signal COM is supplied to the electrode 611 and the reference voltage signal VBS with a constant potential is supplied to the electrode 612. That is, the piezoelectric element 60 is driven such that the central portion of the piezoelectric element 60 is displaced in the vertical direction as a result of a variation of the voltage value of the drive signal VOUT supplied to the electrode 611.

The vibration plate 621 is located below the piezoelectric element 60 in FIG. 3. In other words, the piezoelectric element 60 is formed on the upper surface of the vibration plate 621 in FIG. 3. The vibration plate 621 is deformed in the vertical direction when the piezoelectric element 60 is driven and displaced in the vertical direction.

The cavity 631 is located below the vibration plate 621 in FIG. 3. The cavity 631 communicates with the reservoir 641 that is shared by multiple ejection units 600. Also, the reservoir 641 communicates with the supply port 661 through which ink stored in the ink cartridge 22 is supplied. Accordingly, ink stored in the ink cartridge 22 is supplied into the cavity 631 via the supply port 661 and the reservoir 641. As a result, the cavity 631 is filled with the ink stored in the ink cartridge 22. The internal volume of the cavity 631 changes as the vibration plate 621 is displaced in the vertical direction. That is, the vibration plate 621 functions as a diaphragm that changes the internal volume of the cavity 631, and the cavity 631 functions as a pressure chamber the internal pressure of which changes when the vibration plate 621 is displaced.

A nozzle 651 is formed in the nozzle plate 632. That is, the ejection unit 600 includes the nozzle 651. The nozzle 651 is an opening formed in the nozzle plate 632 and communicates with the cavity 631. When the internal volume of the cavity 631 changes, the ink filling the cavity 631 is ejected from the nozzle 651.

In the ejection unit 600 configured as described above, when the piezoelectric element 60 is driven to warp upward, the vibration plate 621 is displaced upward. This causes the internal volume of the cavity 631 to increase, and as a result, the ink stored in the reservoir 641 is drawn into the cavity 631. In contrast, when the piezoelectric element 60 is driven to warp downward, the vibration plate 621 is displaced downward. This causes the internal volume of the cavity 631 to decrease, and as a result, an amount of ink corresponding to the decrease in the internal volume of the cavity 631 is ejected from the nozzle 651.

Here, the configuration of the piezoelectric element 60 is not limited to the configuration illustrated in FIG. 3, as long as the piezoelectric element 60 is configured to be driven by the drive signal VOUT corresponding to the drive signal COM and to be able to eject ink from the nozzle 651.

Next, a configuration and an operation of the drive signal selection circuit 200 of the ejection head 20 are described. As described above, the drive signal selection circuit 200 generates and outputs the drive signal VOUT by selecting or deselecting signal waveforms in the drive signal COM based on the clock signal SCK, the print data signal SI, the latch signal LAT, and the change signal CH. Therefore, before describing the functional configuration of the drive signal selection circuit 200, an example of waveforms of the drive signal COM to be input to the drive signal selection circuit 200 is described.

Figure 4:
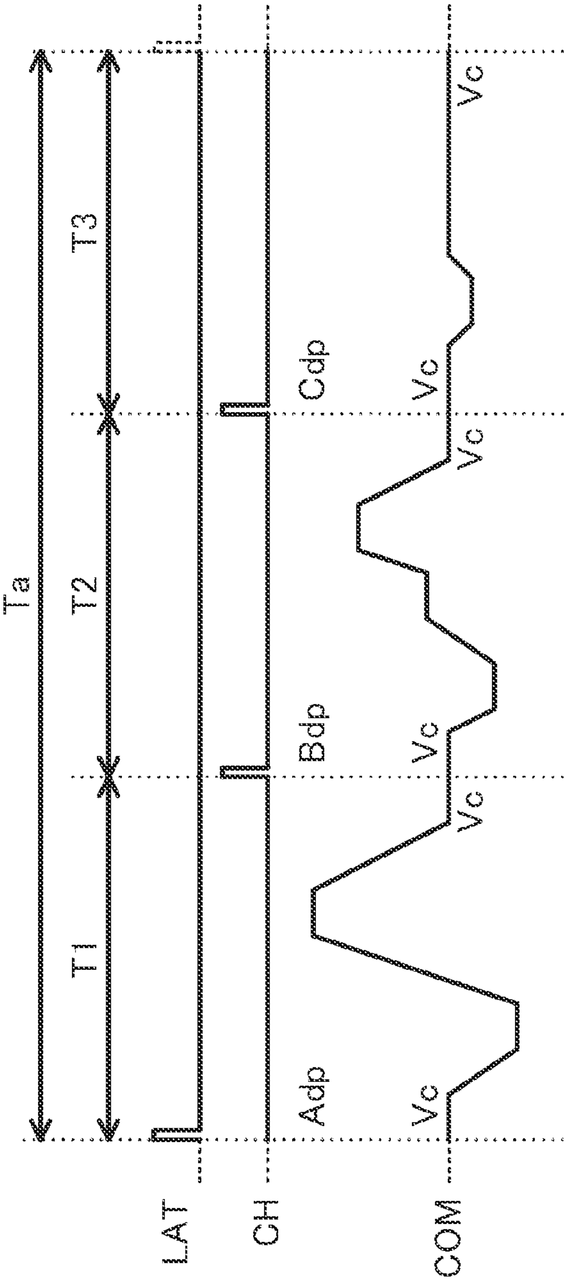
FIG. 4 is a drawing illustrating an example of waveforms of a drive signal COM.

FIG. 4 is a drawing illustrating an example of waveforms of the drive signal COM. As illustrated in FIG. 4, the drive signal COM includes a trapezoidal waveform Adp in a period T1 from the rise of the latch signal LAT to the rise of the change signal CH, a trapezoidal waveform Bdp in a period T2 from the rise of the change signal CH to the next rise of the change signal CH, and a trapezoidal waveform Cdp in a period T3 from the rise of the change signal CH to the rise of the latch signal LAT. The trapezoidal waveform Adp, when supplied to the piezoelectric element 60, drives the piezoelectric element 60 to eject a predetermined amount of ink from the ejection unit 600 corresponding to the piezoelectric element 60. The trapezoidal waveform Bdp, when supplied to the piezoelectric element 60, drives the piezoelectric element 60 to eject an amount of ink less than the predetermined amount from the ejection unit 600 corresponding to the piezoelectric element 60. The trapezoidal waveform Cdp, when supplied to the piezoelectric element 60, drives the piezoelectric element 60 to such an extent that ink is not ejected from the ejection unit 600 corresponding to the piezoelectric element 60. Here, when the trapezoidal waveform Cdp is supplied to the piezoelectric element 60, the piezoelectric element 60 vibrates ink near the nozzle opening of the corresponding ejection unit 600. This reduces the probability that the viscosity of ink near the nozzle opening increases.

Here, at the start timing and the end timing, all of the trapezoidal waveforms Adp, Bdp, and Cdp have the same voltage Vc and the same shape. That is, each of the trapezoidal waveforms Adp, Bdp, and Cdp starts at the voltage Vc and ends at the voltage Vc.

In the descriptions below, a predetermined amount of ink ejected from the ejection unit 600 corresponding to the piezoelectric element 60 to which the trapezoidal waveform Adp is supplied may be referred to as a medium amount, and an amount of ink that is less than the predetermined amount and ejected from the ejection unit 600 corresponding to the piezoelectric element 60 to which the trapezoidal waveform Bdp is supplied may be referred to as a small amount. Also, an operation performed when the trapezoidal waveform Cdp is supplied to the piezoelectric element 60 to vibrate ink near the nozzle opening of the ejection unit 600 corresponding to the piezoelectric element 60 and thereby prevent an increase in ink viscosity may be referred to as micro vibration. Here, the waveforms of the drive signal COM illustrated in FIG. 4 are non-limiting examples, and various combinations of waveforms may be used depending on, for example, the property of ink to be ejected and/or the material of the medium P on which the ink lands.

The ejection head 20 controls the amount of ink to be ejected by selecting or deselecting the trapezoidal waveforms Adp, Bdp, and Cdp in a cycle Ta including the periods T1, T2, and T3. As a result, the size of a dot formed on the medium P in the cycle Ta is controlled. The cycle Ta including the periods T1, T2, and T3 corresponds to a dot formation cycle in which a dot with a predetermined size is formed on the medium P.

Figure 5:
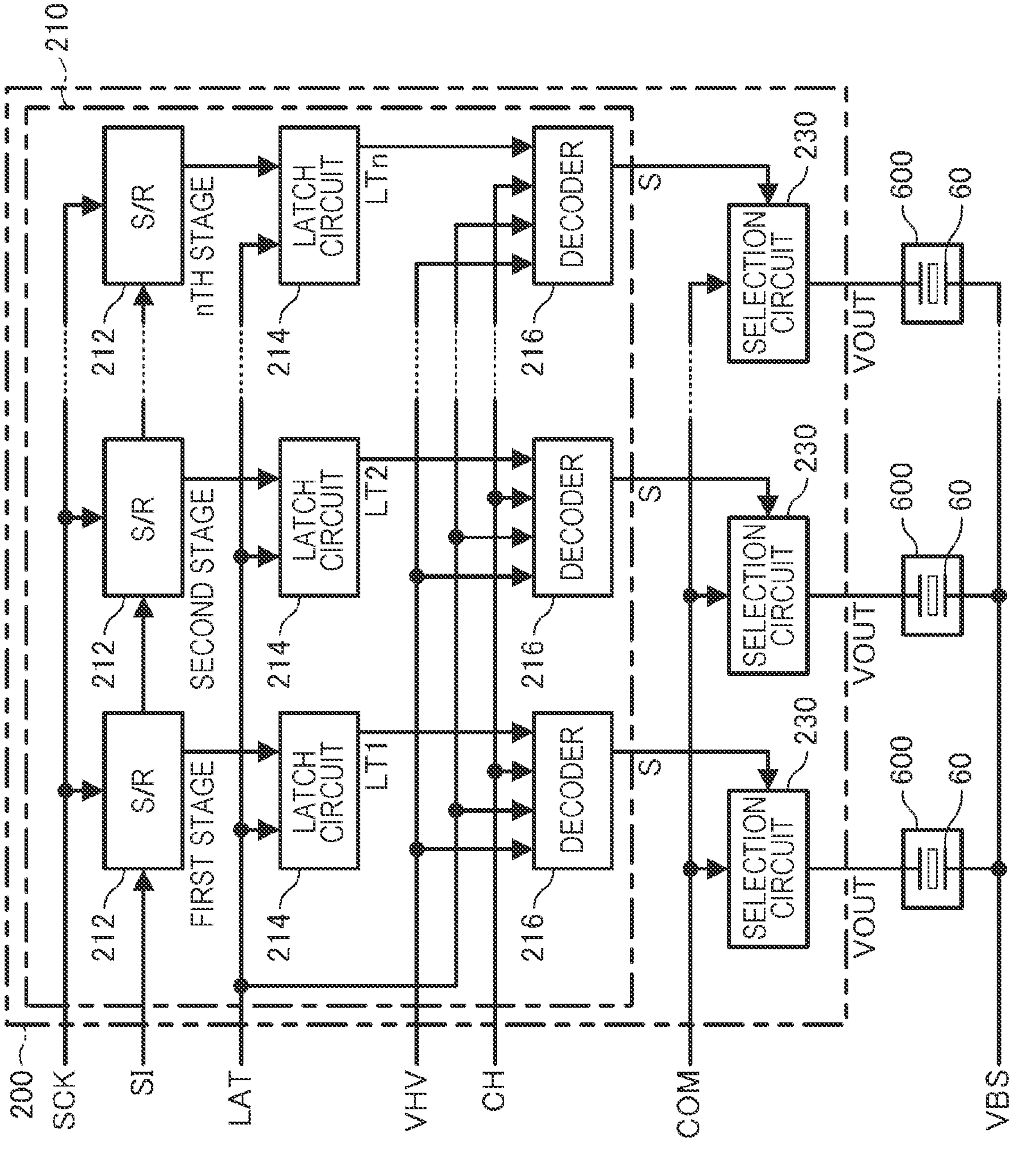
FIG. 5 is a drawing illustrating a configuration of a drive signal selection circuit.

Next, a configuration and an operation of the drive signal selection circuit 200, which generates the drive signal VOUT by selecting or deselecting signal waveforms included in the drive signal COM, are described. FIG. 5 is a drawing illustrating a configuration of the drive signal selection circuit 200. As illustrated in FIG. 5, the drive signal selection circuit 200 includes the selection control circuit 210 and the n selection circuits 230.

The selection control circuit 210 receives the clock signal SCK, the print data signal SI, the latch signal LAT, and the change signal CH. The selection control circuit 210 includes a combination of a shift register (S/R) 212, a latch circuit 214, and a decoder 216 for each of the n ejection units 600. That is, the drive signal selection circuit 200 includes n shift registers 212, n latch circuits 214, and n decoders 216.

The print data signal SI is input to the selection control circuit 210 in synchronization with the clock signal SCK. Also, the print data signal SI includes, for the respective n ejection units 600, serially-arranged multiple sets of two-bit print data [SIH, SIL] each of which is used to select one of "large dot LD", "medium dot MD", "small dot SD", and "non-recording ND". In other words, the print data signal SI is a 2n-bit serial signal. The multiple sets of print data [SIH, SIL] included in the print data signal SI are stored in the n shift registers 212 corresponding to the n ejection units 600. Specifically, the n shift registers 212 corresponding to the n ejection units 600 are coupled to each other in a cascade, and serially-input print data signal SI is sequentially transferred to the shift registers 212 in the subsequent stages according to the clock signal SCK. Then, when the multiple sets of print data [SIH, SIL] are stored in the corresponding shift registers 212, the clock signal SCK stops. In other words, when the supply of the clock signal SCK stops, the multiple sets of print data [SIH, SIL] included in the print data signal SI are stored in the corresponding shift registers 212. In FIG. 5, to distinguish the n shift registers 212, stage numbers "first stage", "second stage", . . . , and "nth stage" are sequentially assigned to the n shift registers 212 from the upstream in the flow of the print data signal SI.

Figures 6, 7:
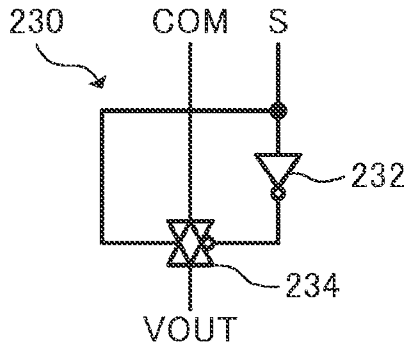
FIG. 6 is a table showing an example of information decoded by a decoder.
FIG. 7 is a drawing illustrating a configuration of a selection circuit corresponding to one ejection unit.

The n latch circuits 214 simultaneously latch the multiple sets of print data [SIH, SIL] stored in the corresponding shift registers 212 at the rise of the latch signal LAT. The multiple sets of print data [SIH, SIL] latched by the latch circuits 214 are input to the corresponding decoders 216. FIG. 6 is a table showing an example of information decoded by the decoder 216. The decoder 216 outputs, in each of the periods T1, T2, and T3, a selection signal S with a logic level specified by input print data [SIH, SIL]. For example, when print data [SIH, SIL]=[1, 0] is input to the decoder 216, the decoder 216 outputs selection signals S with logic levels H, L, and L in the corresponding periods T1, T2, and T3.

The selection signal S output by the decoder 216 is input to the selection circuit 230. The selection circuit 230 is provided for each of the n ejection units 600. That is, the drive signal selection circuit 200 includes n selection circuits 230 corresponding to the n ejection units 600. FIG. 7 is a drawing illustrating a configuration of the selection circuit 230 corresponding to one ejection unit 600. As illustrated in FIG. 7, the selection circuit 230 includes an inverter 232, which is a NOT circuit, and a transfer gate 234.

The selection signal S is input to a positive control terminal of the transfer gate 234 not marked with a circle and is also input to a negative control terminal of the transfer gate 234 marked with a circle after the logic level is inverted by the inverter 232. Also, the drive signal COM is supplied to the input terminal of the transfer gate 234. The transfer gate 234 electrically connects the input terminal and the output terminal of the transfer gate 234 to each other when a high-level selection signal S is input, and electrically disconnects the input terminal and the output terminal from each other when a low-level selection signal S is input. That is, the transfer gate 234 outputs a signal waveform included in the drive signal COM from the output terminal when the logic level of the selection signal S is high and does not output a signal waveform included in the drive signal COM from the output terminal when the logic level of the selection signal S is low.

Then, the drive signal selection circuit 200 outputs a signal output to the output terminal of the transfer gate 234 of the selection circuit 230 as the drive signal VOUT.

Figure 8:
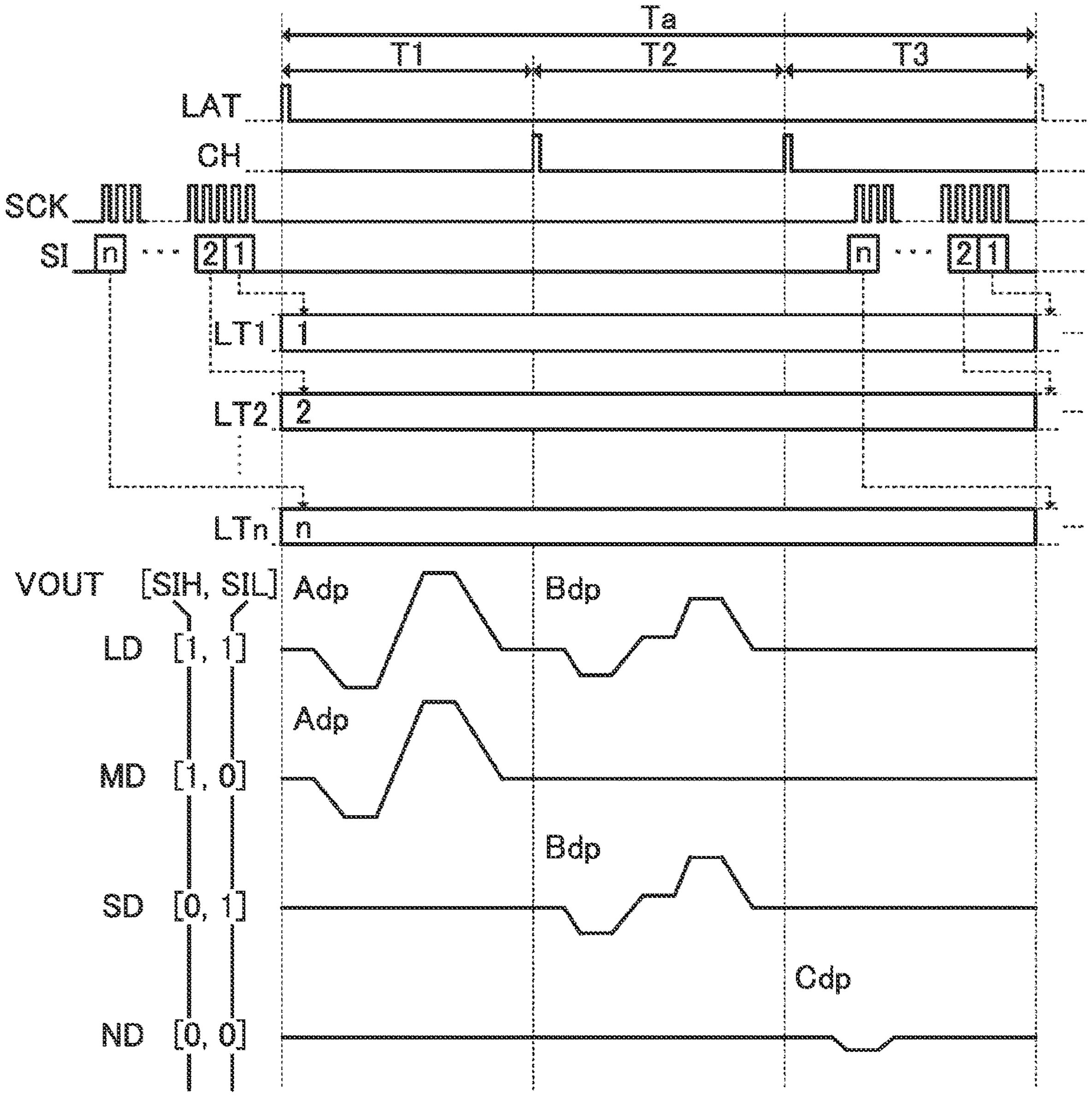
FIG. 8 is a timing chart for describing an operation of a drive signal selection circuit.

Here, an operation of the drive signal selection circuit 200 is described with reference to FIG. 8. FIG. 8 is a timing chart for describing an operation of the drive signal selection circuit 200. The print data signal SI is input to the selection control circuit 210 as a serial signal synchronized with the clock signal SCK. Then, the print data signal SI is sequentially transferred through the n shift registers 212 corresponding to the n ejection units 600 in synchronization with the clock signal SCK. When the input of the clock signal SCK is stopped, sets of print data [SIH, SIL] corresponding to the n ejection units 600 are stored in the shift registers 212. Here, the print data signal SI is input in the order corresponding to the order of the ejection units 600 for the nth stage, . . . , 2nd stage, and 1st stage shift registers 212.

Then, when the latch signal LAT rises, the latch circuits 214 simultaneously latch the sets of print data [SIH, SIL] stored in the shift registers 212. Here, LT1, LT2, . . . , and LTn in FIG. 8 indicate the sets of print data [SIH, SIL] latched by the latch circuits 214 corresponding to the 1st, 2nd, . . . , and nth stage shift registers 212.

The decoder 216 outputs the selection signals S with the logic levels as shown in FIG. 6 in the respective periods T1, T2, and T3 according to a dot size specified by the latched print data [SIH, SIL]. Then, the selection circuit 230 generates the drive signal VOUT by selecting or deselecting signal waveforms in the drive signal COM according to the logic levels of the selection signals S output by the decoder 216.

Specifically, when print data [SIH, SIL]=[1, 1] is input to the decoder 216, the decoder 216 sets the logic levels of the selection signals S in the periods T1, T2, and T3 to H, H, and L, respectively. In this case, the selection circuit 230 selects the trapezoidal waveform Adp in the period T1, selects the trapezoidal waveform Bdp in the period T2, and does not select the trapezoidal waveform Cdp in the period T3. As a result, the drive signal selection circuit 200 outputs the drive signal VOUT corresponding to "large dot LD".

When the drive signal VOUT corresponding to "large dot LD" and output by the drive signal selection circuit 200 is supplied to the piezoelectric element 60 of the ejection unit 600, the ejection unit 600 ejects a medium amount of ink in the period T1, ejects a small amount of ink in the period T2, and does not eject ink in the period T3. When the medium amount of ink and the small amount of ink ejected from the ejection unit 600 land on the medium P and join together, "large dot LD" is formed on the medium P.

Also, when print data [SIH, SIL]=[1, 0] is input to the decoder 216, the decoder 216 sets the logic levels of the selection signals S in the periods T1, T2, and T3 to H, L, and L, respectively. In this case, the selection circuit 230 selects the trapezoidal waveform Adp in the period T1, does not select the trapezoidal waveform Bdp in the period T2, and does not select the trapezoidal waveform Cdp in the period T3. As a result, the drive signal selection circuit 200 outputs the drive signal VOUT corresponding to "medium dot MD".

When the drive signal VOUT corresponding to "medium dot MD" and output by the drive signal selection circuit 200 is supplied to the piezoelectric element 60 of the ejection unit 600, the ejection unit 600 ejects a medium amount of ink in the period T1, does not eject ink in the period T2, and does not eject ink in the period T3. When the medium amount of ink ejected from the ejection unit 600 lands on the medium P, "medium dot MD" is formed on the medium P.

When print data [SIH, SIL]=[0, 1] is input to the decoder 216, the decoder 216 sets the logic levels of the selection signals S in the periods T1, T2, and T3 to L, H, and L, respectively. In this case, the selection circuit 230 does not select the trapezoidal waveform Adp in the period T1, selects the trapezoidal waveform Bdp in the period T2, and does not select the trapezoidal waveform Cdp in the period T3. As a result, the drive signal selection circuit 200 outputs the drive signal VOUT corresponding to "small dot SD".

When the drive signal VOUT corresponding to "small dot SD" and output by the drive signal selection circuit 200 is supplied to the piezoelectric element 60 of the ejection unit 600, the ejection unit 600 does not eject ink in the period T1, ejects a small amount of ink in the period T2, and does not eject ink in the period T3. When the small amount of ink ejected from the ejection unit 600 lands on the medium P, "small dot SD" is formed on the medium P.

When print data [SIH, SIL]=[0, 0] is input to the decoder 216, the decoder 216 sets the logic levels of the selection signals S in the periods T1, T2, and T3 to L, L, and H, respectively. In this case, the selection circuit 230 does not select the trapezoidal waveform Adp in the period T1, does not select the trapezoidal waveform Bdp in the period T2, and selects the trapezoidal waveform Cdp in the period T3. As a result, the drive signal selection circuit 200 outputs the drive signal VOUT corresponding to "non-recording ND".

When the drive signal VOUT corresponding to "non-recording ND" and output by the drive signal selection circuit 200 is supplied to the piezoelectric element 60 of the ejection unit 600, the ejection unit 600 does not eject ink in the period T1, does not eject ink in the period T2, and does not eject ink in the period T3. Accordingly, no ink is ejected from the ejection unit 600, resulting in "non-recording ND" in which no dot is formed on the medium P.

Here, when print data [SIH, SIL]=[0, 0] is input to the decoder 216, the corresponding selection circuit 230 does not select the trapezoidal waveform Adp in the period T1, does not select the trapezoidal waveform Bdp in the period T2, and selects the trapezoidal waveform Cdp in the period T3. That is, the selection circuit 230 outputs the drive signal VOUT including the trapezoidal waveform Cdp. As a result, micro vibration BSD is performed to reduce the probability that the viscosity of ink near the nozzle opening of the corresponding ejection unit 600 increases.

As described above, in the liquid ejecting apparatus 1 of the present embodiment, the ejection head 20 includes the piezoelectric element 60 as an example of a driven element that is driven by the drive signal COM and ejects ink, which is an example of a liquid, when the piezoelectric element 60 is driven.

4. Configuration and Operation of Drive Circuit

Figure 9:
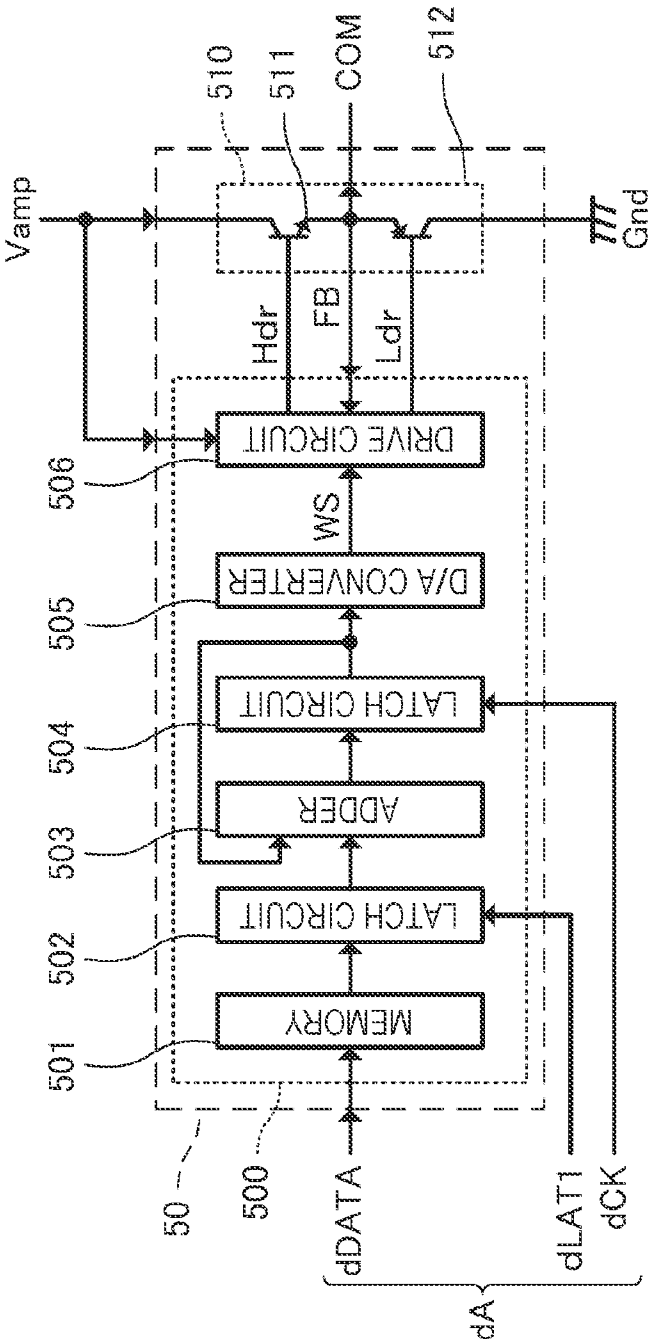
FIG. 9 is a drawing illustrating an example of a configuration of a drive circuit.

Next, a configuration and an operation of the drive circuit 50 are described. FIG. 9 is a drawing illustrating an example of a configuration of the drive circuit 50. As illustrated in FIG. 9, the drive circuit 50 includes an amplification control circuit 500 and an amplifier circuit 510.

The amplification control circuit 500 includes a memory 501, a latch circuit 502, an adder 503, a latch circuit 504, a digital-to-analog (D/A) converter 505, and a drive circuit 506. The amplification control circuit 500 receives voltage variation data dDATA, a latch signal dLAT, and a clock signal dCK each of which is output as the base drive signal dA by the control circuit 100.

The memory 501 stores voltage variation information Dv included in the voltage variation data dDATA that is output as the base drive signal dA by the control circuit 100. The latch circuit 502 latches the voltage variation information Dv stored in the memory 501 at the rise of the latch signal dLAT that is output as the base drive signal dA by the control circuit 100. Then, the latch circuit 502 outputs the latched voltage variation information Dv to the adder 503. The adder 503 receives the voltage variation information Dv latched by the latch circuit 502 and an output of the latch circuit 504 described later. The adder 503 calculates and retains summed voltage variation information that indicates the sum of the voltage variation information Dv latched by the latch circuit 502 and the output of the latch circuit 504.

The latch circuit 504 latches, at the rise of the clock signal dCK, the summed voltage variation information calculated and retained by the adder 503. Then, the latch circuit 504 outputs the latched summed voltage variation information to the adder 503 and the D/A converter 505. That is, the adder 503 newly calculates and retains summed voltage variation information by adding the voltage variation information Dv latched by the latch circuit 502 to the summed voltage variation information latched by the latch circuit 504.

The D/A converter 505 converts the summed voltage variation information output by the latch circuit 504 into an analog signal and outputs the analog signal to the drive circuit 506 as a drive waveform signal WS. A signal obtained by amplifying the drive waveform signal WS corresponds to the drive signal COM. The drive circuit 506 generates amplification control signals Hdr and Ldr according to the drive waveform signal WS input from the D/A converter 505 and a feedback signal FB fed back from the amplifier circuit 510 described later, and outputs the amplification control signals Hdr and Ldr to the amplifier circuit 510.

Figure 10:
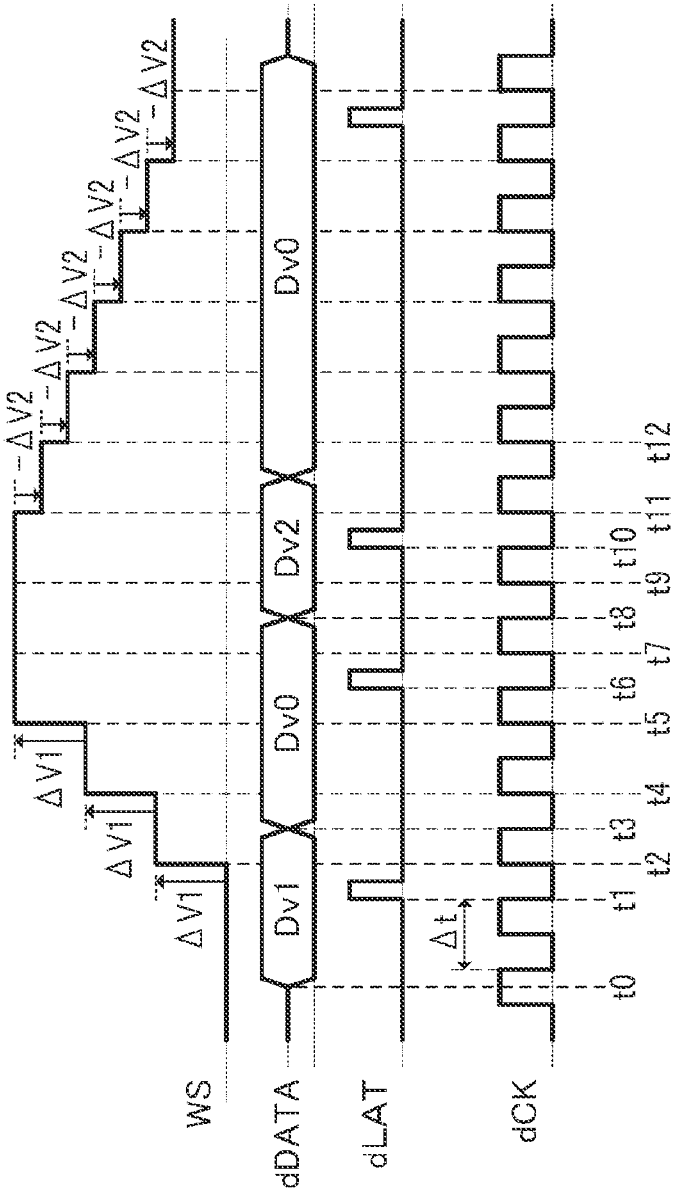
FIG. 10 is a timing chart for describing an example of an operation of an amplification control circuit.

Here, an example of an operation of the amplification control circuit 500 is described. FIG. 10 is a timing chart for describing an example of an operation of the amplification control circuit 500. As illustrated in FIG. 10, at time t0, the control circuit 100 generates the voltage variation data dDATA including voltage variation information Dv1 for changing the voltage value by a voltage Δv1 and outputs the voltage variation data dDATA to the memory 501 as the base drive signal dA. As a result, the voltage variation information Dv1 is stored in the memory 501.

Then, at time t1, the control circuit 100 sets the logic level of the latch signal dLAT, which is to be output as the base drive signal dA, to high. As a result, the voltage variation information Dv1 stored in the memory 501 is latched by the latch circuit 502. Next, at time t3, the control circuit 100 outputs the voltage variation data dDATA, which includes voltage variation information Dv0 for keeping the voltage value constant, to the memory 501 as the base drive signal dA. As a result, the voltage variation information Dv0 is stored in the memory 501 in place of the voltage variation information Dv1.

The voltage variation information Dv1 latched by the latch circuit 502 is input to the adder 503. The adder 503 adds the voltage variation information Dv1 latched by the latch circuit 502 to the summed voltage variation information output by the latch circuit 504 and retains the result of addition as new summed voltage variation information.

Also, the control circuit 100 generates the clock signal dCK that becomes high (H level) at an interval AT and outputs the clock signal dCK to the latch circuit 504 as the base drive signal dA. Then, when a H-level clock signal dCK is input to the latch circuit 504 at each of time t2, time t4, and time t5, the latch circuit 504 latches summed voltage variation information the voltage value of which has been increased by the voltage ΔV1 and outputs the summed voltage variation information to the D/A converter 505. In response, at each of time t2, time t4, and time t5, the D/A converter 505 generates and outputs the drive waveform signal WS the voltage value of which increases by the voltage ΔV1.

At subsequent time t6, the control circuit 100 sets the logic level of the latch signal dLAT, which is to be output as the base drive signal dA, to high. As a result, the voltage variation information Dv0 for keeping the voltage value stored in the memory 501 constant is latched by the latch circuit 502. Also, at subsequent time t8, the control circuit 100 generates the voltage variation data dDATA including voltage variation information Dv2 for changing the voltage value by a voltage −ΔV2 and outputs the voltage variation information Dv2 to the memory 501 as the base drive signal dA. As a result, the memory 501 stores the voltage variation information Dv2 in place of the voltage variation information Dv0.

The voltage variation information Dv0 latched by the latch circuit 502 is input to the adder 503. The adder 503 adds the voltage variation information Dv0 latched by the latch circuit 502 to the summed voltage variation information output by the latch circuit 504 and retains the result of addition as new summed voltage variation information.

Also, at each of time t7 and time t9, the H-level clock signal dCK is input to the latch circuit 504. In this case, because the voltage variation information Dv0 latched by the latch circuit 502 is for keeping the voltage value constant, the latch circuit 504 latches summed voltage variation information that does not cause a change in the voltage value even when the H-level clock signal dCK is input and outputs the summed voltage variation information to the D/A converter 505. As a result, at each of time t7 and time t9, the D/A converter 505 generates and outputs the drive waveform signal WS with a constant voltage value.

Then, at time t10, the control circuit 100 sets the logic level of the latch signal dLAT, which is to be output as the base drive signal dA, to high. As a result, the voltage variation information Dv2 for changing the voltage value stored in the memory 501 by the voltage −ΔV2 is latched by the latch circuit 502.

The voltage variation information Dv2 latched by the latch circuit 502 is input to the adder 503. The adder 503 adds the voltage variation information Dv2 latched by the latch circuit 502 to the summed voltage variation information output by the latch circuit 504 and retains the result of addition as new summed voltage variation information.

Also, the control circuit 100 generates the clock signal dCK that becomes high (H level) at the interval AT and outputs the clock signal dCK to the latch circuit 504 as the base drive signal dA. Then, when the H-level clock signal dCK is input to the latch circuit 504 at each of time t11 and time t12, the latch circuit 504 latches summed voltage variation information the voltage value of which has been decreased by the voltage ΔV2 and outputs the summed voltage variation information to the D/A converter 505. In response, at each of time t11 and time t12, the D/A converter 505 generates and outputs the drive waveform signal WS the voltage value of which decreases by the voltage ΔV2.

Thus, the drive circuit 506 receives the drive waveform signal WS the voltage value of which increases, the drive waveform signal WS the voltage value of which is constant, and the drive waveform signal WS the voltage value of which decreases. The drive circuit 506 generates the amplification control signals Hdr and Ldr according to the voltage value of the input drive waveform signal WS and the feedback signal FB fed back from the amplifier circuit 510 described later, and outputs the amplification control signals Hdr and Ldr to the amplifier circuit 510.

Referring back to FIG. 9, the amplifier circuit 510 includes a transistor 511 and a transistor 512. In the present embodiment, the transistor 511 is an NPN transistor and the transistor 512 is a PNP transistor.

The voltage signal Vamp is input to the collector terminal of the transistor 511, and the amplification control signal Hdr is input to the base terminal of the transistor 511. The emitter terminal of the transistor 511 is electrically connected to the emitter terminal of the transistor 512. The amplification control signal Ldr is input to the base terminal of the transistor 512, and a ground potential Gnd is input to the collector terminal of the transistor 512. A signal at the connection point between the emitter terminal of the transistor 511 and the emitter terminal of the transistor 512 is output as the drive signal COM and is also fed back to the drive circuit 506 as the feedback signal FB.

In the amplifier circuit 510 as described above, the transistor 511 is controlled such that the collector terminal and the emitter terminal of the transistor 511 are electrically connected to each other when the voltage value of the drive waveform signal WS increases. As a result, the drive signal COM, the voltage value of which increases according to the voltage signal Vamp based on the voltage signal VHV, is output to the connection point between the emitter terminal of the transistor 511 and the emitter terminal of the transistor 512. In contrast, the transistor 512 is controlled such that the emitter terminal and the collector terminal of the transistor 512 are electrically connected to each other when the voltage value of the drive waveform signal WS decreases. As a result, the drive signal COM, the voltage value of which decreases according to the ground potential Gnd, is output to the connection point between the emitter terminal of the transistor 511 and the emitter terminal of the transistor 512.

That is, when the voltage value of the drive waveform signal WS output by the D/A converter 505 increases, the drive circuit 506 outputs the amplification control signal Hdr for controlling the transistor 511 such that the collector terminal and the emitter terminal of the transistor 511 are electrically connected to each other and the amplification control signal Ldr for controlling the transistor 512 such that the emitter terminal and the collector terminal of the transistor 512 are electrically disconnected from each other; and when the voltage value of the drive waveform signal WS output by the D/A converter 505 decreases, the drive circuit 506 outputs the amplification control signal Hdr for controlling the transistor 511 such that the collector terminal and the emitter terminal of the transistor 511 are electrically disconnected from each other and the amplification control signal Ldr for controlling the transistor 512 such that the emitter terminal and the collector terminal of the transistor 512 are electrically connected to each other. Here, the drive circuit 506 controls the amounts of current of signals output as the amplification control signals Hdr and Ldr based on the feedback signal FB. This results in controlling the current amplification factor of the drive signal COM supplied to the ejection head 20.

When the voltage value of the drive waveform signal WS is constant, the transistor 511 is controlled such that the collector terminal and the emitter terminal of the transistor 511 are electrically disconnected from each other, and the transistor 512 is also controlled such that the emitter terminal and the collector terminal of the transistor 512 are electrically disconnected from each other. That is, when the voltage value of the drive waveform signal WS output by the D/A converter 505 is constant, the drive circuit 506 outputs the amplification control signal Hdr for controlling the transistor 511 such that the collector terminal and the emitter terminal of the transistor 511 are electrically disconnected from each other and the amplification control signal Ldr for controlling the transistor 512 such that the emitter terminal and the collector terminal of the transistor 512 are electrically disconnected from each other. As a result, a constant drive signal COM with an immediately-preceding voltage value is output to the connection point between the emitter terminal of the transistor 511 and the emitter terminal of the transistor 512.

As described above, the drive circuit 50 of the present embodiment includes the amplifier circuit 510 that outputs the drive signal COM. The amplifier circuit 510 includes the transistor 511 that includes the collector terminal as one end to which the voltage signal Vamp based on the voltage signal VHV is supplied; and the transistor 512 that includes the emitter terminal as one end which is electrically connected to another end, i.e., the emitter terminal of the transistor 511 and includes the collector terminal as another end to which the ground potential Gnd is supplied. The amplifier circuit 510 amplifies, through the operations of the transistors 511 and 512, the base drive signal dA, based on which the drive signal COM is generated, according to the voltage signal Vamp that is based on the voltage signal VHV corresponding to an amplification voltage.

5. Configuration and Operation of Leakage Current Detection Circuit

Next, a configuration and an operation of the leakage current detection circuit 70 are described. In the liquid ejecting apparatus 1 of the present embodiment, as described above, the drive circuit 50 generates the drive signal COM according to the voltage signal Vamp based on the voltage signal VHV with a high voltage and outputs the drive signal COM to the ejection head 20. If a leakage current is generated in the drive circuit 50, unintended heat generation may occur in the drive circuit 50 according to the leakage current and the voltage signal Vamp based on the high voltage signal VHV. Such unintended heat generation in the drive circuit 50 may affect the characteristics of various electronic components of the drive circuit 50. This in turn may reduce the waveform accuracy of the drive signal COM output by the drive circuit 50 and reduce the operational stability of the drive circuit 50. In particular, in the transistor 511 to which the high voltage signal Vamp is supplied, the heat generation caused by the leakage current may become significant.

For the above reason, the leakage current detection circuit 70 of the present embodiment detects a leakage current that may be generated in the drive circuit 50, particularly the leakage current that may be generated in the transistor 511, to reduce the probability that unintended heat generation occurs in the drive circuit 50, thereby reduce the probability that the characteristics of various electronic components of the drive circuit 50 unintendedly change, and thereby reduce the probability that the waveform accuracy of the drive signal COM output by the drive circuit 50 decreases and the probability that the operational stability of the drive circuit 50 is reduced. In other words, in the liquid ejecting apparatus 1 of the present embodiment, the leakage current detection circuit 70 is electrically connected to the transistor 511 in the amplifier circuit 510 to which the voltage signal Vamp is supplied and configured to detect the leakage current that may be generated in the drive circuit 50 to reduce the probability that unintended heat generation occurs in the drive circuit 50, thereby reduce the probability that the characteristics of various electronic components of the drive circuit 50 unintendedly change, and thereby reduce the probability that the waveform accuracy of the drive signal COM output by the drive circuit 50 decreases and the probability that the operational stability of the drive circuit 50 is reduced.

Figure 11:
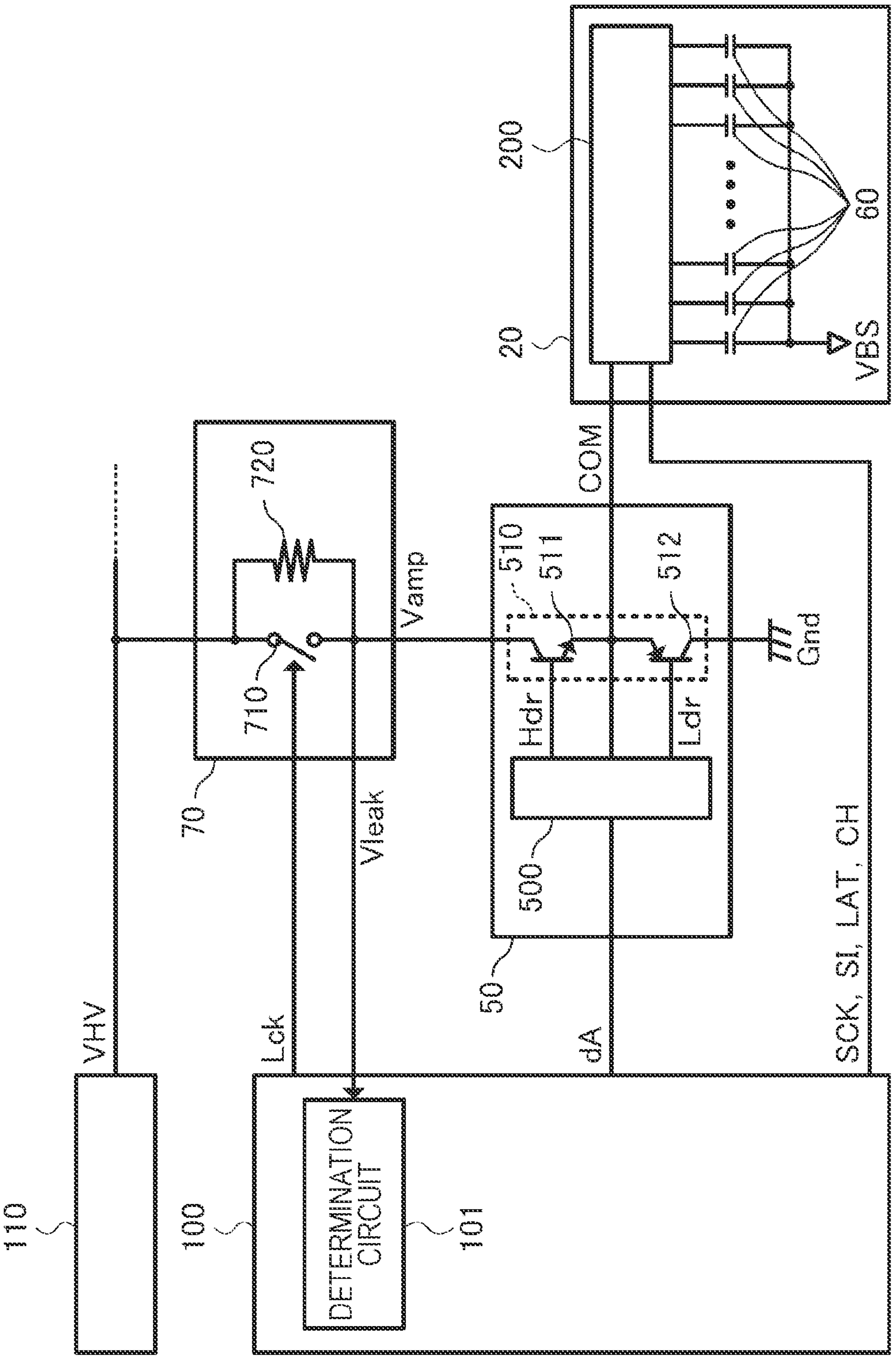
FIG. 11 is a drawing for describing a configuration and operations of a leakage current detection circuit.

Next, a specific configuration and operation of the leakage current detection circuit 70 are described. FIG. 11 is a drawing for describing a configuration and operations of the leakage current detection circuit 70. As illustrated in FIG. 11, the leakage current detection circuit 70 includes a switch circuit 710 and a resistance element 720. One end of the switch circuit 710 receives the voltage signal VHV, and another end of the switch circuit 710 is electrically connected to the collector terminal of the transistor 511 of the drive circuit 50. The switch circuit 710 may be implemented by various types of switching devices such as a transistor. One end of the resistance element 720 receives the voltage signal VHV, and another end of the resistance element 720 is electrically connected to the collector terminal of the transistor 511 of the drive circuit 50. In other words, the leakage current detection circuit 70 includes the switch circuit 710 and the resistance element 720, one end of the switch circuit 710 is electrically connected to one end of the resistance element 720, and another end of the switch circuit 710 and another end of the resistance element 720 are electrically connected to the transistor 511.

In the leakage current detection circuit 70 configured as described above, the conduction state between one end and the other end of the switch circuit 710 is controlled according to the detection control signal Lck output by the control circuit 100. Accordingly, when the switch circuit 710 is controlled by the detection control signal Lck such that one end and the other end of the switch circuit 710 are electrically connected to each other, the leakage current detection circuit 70 outputs the voltage signal VHV passing through the switch circuit 710 to the drive circuit 50 as the voltage signal Vamp; and when the switch circuit 710 is controlled by the detection control signal Lck such that one end and the other end of the switch circuit 710 are electrically disconnected from each other, the leakage current detection circuit 70 outputs the voltage signal VHV passing through the resistance element 720 to the drive circuit 50 as the voltage signal Vamp.

Also, the leakage current detection circuit 70 outputs a signal at a connection point between the other end of the switch circuit 710 and the other end of the resistance element 720 to a determination circuit 101 of the control circuit 100 as the detection voltage Vleak. That is, the leakage current detection circuit 70 outputs, to the determination circuit 101, a signal having the same potential as the voltage signal Vamp output to the drive circuit 50, as the detection voltage Vleak.

The determination circuit 101 determines whether a leakage current is generated in the drive circuit 50 based on the voltage value of the detection voltage Vleak input to the determination circuit 101. That is, the liquid ejecting apparatus 1 of the present embodiment includes the determination circuit 101 that determines whether a leakage current generated in the drive circuit 50 is greater than or equal to a predetermined threshold, and the determination circuit 101 determines whether a leakage current is generated in the drive circuit 50 based on the voltage value of the transmission path through which the voltage signal Vamp is transmitted. The determination circuit 101 may also be provided as a component separate from the control circuit 100.

When the determination circuit 101 determines, based on the detection voltage Vleak, that the amount of the leakage current generated in the drive circuit 50 is greater than or equal to the predetermined threshold, the control circuit 100 controls the transistor 511 to be non-conductive. Specifically, when the determination circuit 101 determines that the amount of the leakage current generated in the drive circuit 50 is greater than or equal to the predetermined threshold, the control circuit 100 generates a base drive signal dA for controlling the transistor 511 to be non-conductive and outputs the base drive signal dA to the drive circuit 50. In response, the drive circuit 50 controls the transistor 511 to be non-conductive and stops outputting the drive signal COM.

Here, the control circuit 100 may also be configured to cause the voltage output circuit 110 to stop the generation of the voltage signal VHV when the determination circuit 101 determines that the amount of the leakage current generated in the drive circuit 50 is greater than or equal to the predetermined threshold.

Figure 12:
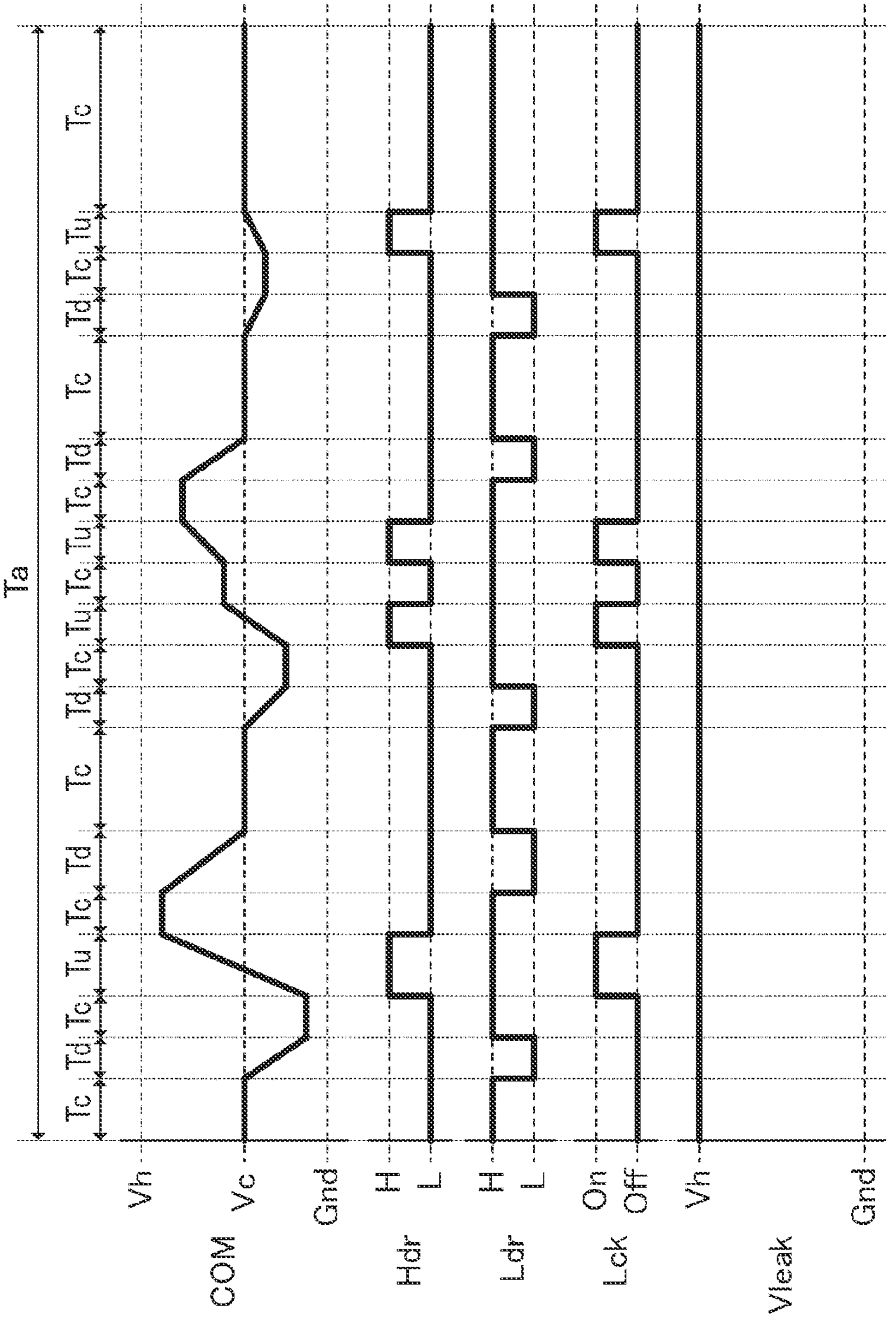
FIG. 12 is a timing chart for describing an example of an operation of the leakage current detection circuit in a case in which no leakage current is generated in a drive circuit.

Next, an example of an operation of the leakage current detection circuit 70 configured as described above is described. FIG. 12 is a timing chart for describing an example of an operation of the leakage current detection circuit 70 in a case in which no leakage current is generated in the drive circuit 50. In the descriptions below, in a cycle Ta of the drive signal COM, a period in which the voltage value of the drive signal COM increases is referred to as a period Tu, a period in which the voltage value of the drive signal COM decreases is referred to as a period Td, and a period in which the voltage value of the drive signal COM is constant is referred to as a period Tc.

In the period Tu in which the leakage current is not generated in the drive circuit 50, the amplification control circuit 500 outputs a H-level amplification control signal Hdr and a H-level amplification control signal Ldr. Accordingly, in the period Tu in which the leakage current is not generated in the drive circuit 50, the transistor 511 is controlled such that the collector terminal and the emitter terminal of the transistor 511 are electrically connected to each other, and the transistor 512 is controlled such that the emitter terminal and the collector terminal of the transistor 512 are electrically disconnected from each other.

Also, in the period Tu in which the leakage current is not generated in the drive circuit 50, the control circuit 100 generates the detection control signal Lck for controlling the switch circuit 710 such that one end and the other end of the switch circuit 710 are electrically connected to each other and outputs the detection control signal Lck to the leakage current detection circuit 70. As a result, the leakage current detection circuit 70 outputs the voltage signal VHV passed through the switch circuit 710 as the voltage signal Vamp. That is, the voltage signal Vamp with the same potential Vh as the voltage signal VHV is supplied to the collector terminal of the transistor 511. As a result, the amplifier circuit 510 outputs the drive signal COM the voltage value of which increases toward the potential Vh.

Also, as described above, the leakage current detection circuit 70 generates the detection voltage Vleak with the same potential as the voltage signal Vamp supplied to the amplifier circuit 510 and outputs the detection voltage Vleak to the determination circuit 101. That is, in the period Tu in which the leakage current is not generated in the drive circuit 50, the leakage current detection circuit 70 generates the detection voltage Vleak with the potential Vh and outputs the detection voltage Vleak to the determination circuit 101.

In the period Td in which the leakage current is not generated in the drive circuit 50, the amplification control circuit 500 outputs a L-level amplification control signal Hdr and a L-level amplification control signal Ldr. Accordingly, in the period Td in which the leakage current is not generated in the drive circuit 50, the transistor 511 is controlled such that the collector terminal and the emitter terminal of the transistor 511 are electrically disconnected from each other, and the transistor 512 is controlled such that the emitter terminal and the collector terminal of the transistor 512 are electrically connected to each other. As a result, the amplifier circuit 510 outputs the drive signal COM the voltage value of which decreases toward the ground potential Gnd.

Also, in the period Td in which the leakage current is not generated in the drive circuit 50, the control circuit 100 generates the detection control signal Lck for controlling the switch circuit 710 such that one end and the other end of the switch circuit 710 are electrically disconnected from each other and outputs the detection control signal Lck to the leakage current detection circuit 70. Accordingly, the leakage current detection circuit 70 outputs the voltage signal VHV passed through the resistance element 720 as the voltage signal Vamp. As a result, the voltage signal VHV passed through the resistance element 720 is supplied to the collector terminal of the transistor 511 as the voltage signal Vamp.

In this case, in the example shown in FIG. 12, because the leakage current is not generated in the drive circuit 50, no electric current flows between the collector terminal and the emitter terminal of the transistor 511 that is controlled to be non-conductive. Accordingly, no electric current flows to the resistance element 720 either. Therefore, no voltage drop is caused by the resistance element 720, and the leakage current detection circuit 70 outputs the voltage signal Vamp with the same potential Vh as the voltage signal VHV. That is, the voltage signal Vamp with the same potential Vh as the voltage signal VHV is supplied to the collector terminal of the transistor 511.

Also, as described above, the leakage current detection circuit 70 outputs, to the determination circuit 101, the detection voltage Vleak with the same potential as the voltage signal Vamp supplied to the amplifier circuit 510. That is, in the period Td in which the leakage current is not generated in the drive circuit 50, the leakage current detection circuit 70 generates the detection voltage Vleak with the potential Vh and outputs the detection voltage Vleak to the determination circuit 101.

In the period Tc in which the leakage current is not generated in the drive circuit 50, the amplification control circuit 500 outputs a L-level amplification control signal Hdr and a H-level amplification control signal Ldr. Accordingly, in the period Tc in which the leakage current is not generated in the drive circuit 50, the transistor 511 is controlled such that the collector terminal and the emitter terminal of the transistor 511 are electrically disconnected from each other, and the transistor 512 is controlled such that the emitter terminal and the collector terminal of the transistor 512 are electrically disconnected from each other. As a result, the amplifier circuit 510 outputs a constant drive signal COM with an immediately-preceding voltage value.

Also, in the period Tc in which the leakage current is not generated in the drive circuit 50, the control circuit 100 generates the detection control signal Lck for controlling the switch circuit 710 such that one end and the other end of the switch circuit 710 are electrically disconnected from each other and outputs the detection control signal Lck to the leakage current detection circuit 70. Accordingly, the leakage current detection circuit 70 outputs the voltage signal VHV passed through the resistance element 720 as the voltage signal Vamp. As a result, the voltage signal VHV passed through the resistance element 720 is supplied to the collector terminal of the transistor 511 as the voltage signal Vamp. In this case, in the example shown in FIG. 12, because the leakage current is not generated in the drive circuit 50, no electric current flows between the collector terminal and the emitter terminal of the transistor 511 that is controlled to be non-conductive. Accordingly, no electric current flows to the resistance element 720 either. Therefore, no voltage drop is caused by the resistance element 720, and the leakage current detection circuit 70 outputs the voltage signal Vamp with the same potential Vh as the voltage signal VHV. That is, the voltage signal Vamp with the same potential Vh as the voltage signal VHV is supplied to the collector terminal of the transistor 511.

Also, as described above, the leakage current detection circuit 70 outputs, to the determination circuit 101, the detection voltage Vleak with the same potential as the voltage signal Vamp supplied to the amplifier circuit 510. That is, in the period Tc in which the leakage current is not generated in the drive circuit 50, the leakage current detection circuit 70 generates the detection voltage Vleak with the potential Vh and outputs the detection voltage Vleak to the determination circuit 101.

Figure 13:
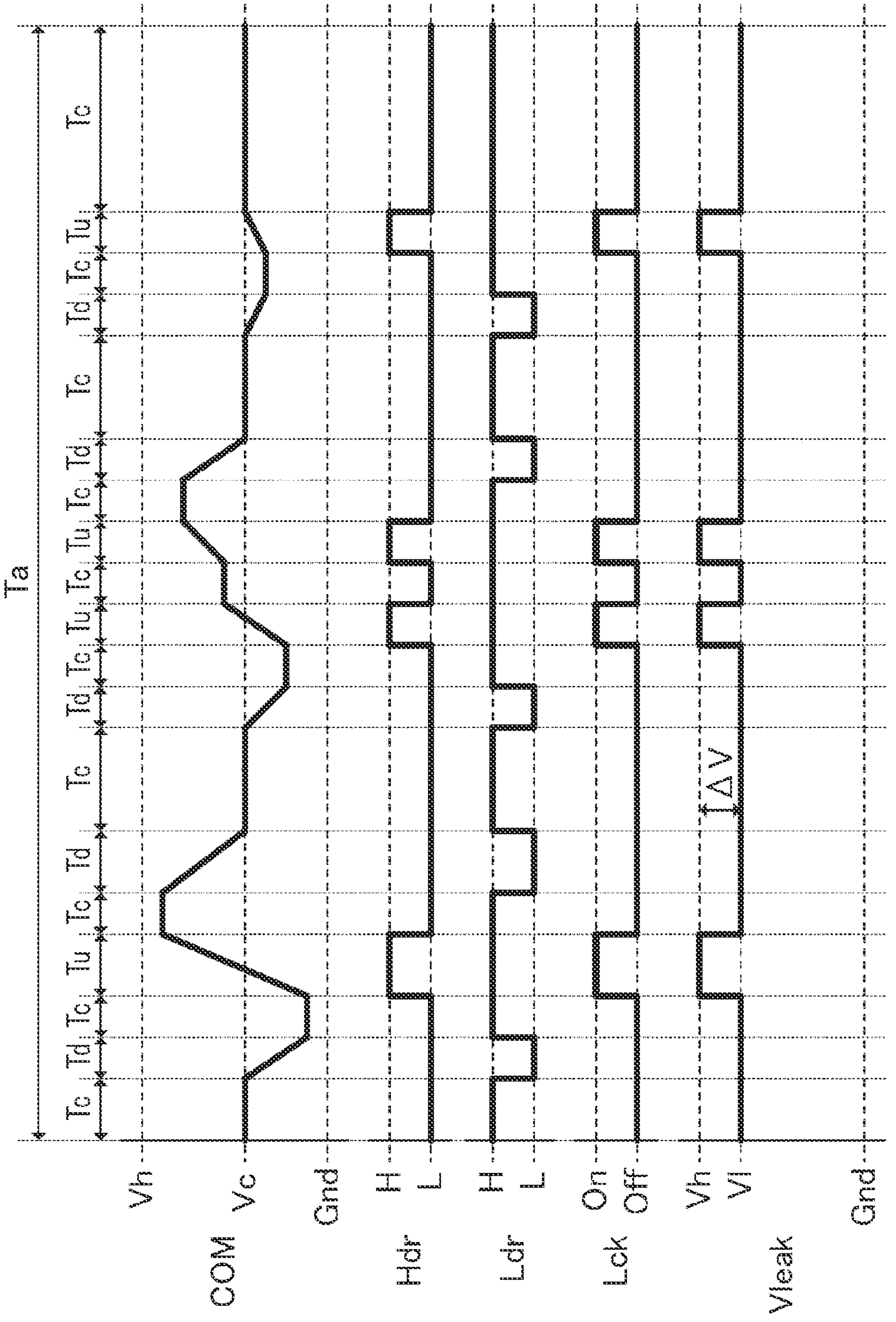
FIG. 13 is a timing chart for describing an example of an operation of the leakage current detection circuit in a case in which a leakage current is generated in the drive circuit.

Next, an example of an operation of the leakage current detection circuit 70 in a case in which the leakage current is generated in the drive circuit 50 is described. FIG. 13 is a timing chart for describing an example of an operation of the leakage current detection circuit 70 in a case in which the leakage current is generated in the drive circuit 50. Similarly to FIG. 12, FIG. 13 illustrates the period Tu in which the voltage value of the drive signal COM increases, the period Td in which the voltage value of the drive signal COM decreases, and the period Tc in which the voltage value of the drive signal COM is constant.

In the period Tu in which the leakage current is generated in the drive circuit 50, as in the period Tu in which the leakage current is not generated in the drive circuit 50, the amplification control circuit 500 outputs a H-level amplification control signal Hdr and a H-level amplification control signal Ldr. Accordingly, the transistor 511 is controlled such that the collector terminal and the emitter terminal of the transistor 511 are electrically connected to each other, and the transistor 512 is controlled such that the emitter terminal and the collector terminal of the transistor 512 are electrically disconnected from each other.

Also, in the period Tu in which the leakage current is generated in the drive circuit 50, as in the period Tu when the leakage current is not generated in the drive circuit 50, the control circuit 100 generates the detection control signal Lck for controlling the switch circuit 710 such that one end and the other end of the switch circuit 710 are electrically connected to each other and outputs the detection control signal Lck to the leakage current detection circuit 70. Therefore, the leakage current detection circuit 70 outputs the voltage signal VHV passed through the switch circuit 710 as the voltage signal Vamp. Accordingly, the voltage signal Vamp with the same potential Vh as the voltage signal VHV is supplied to the collector terminal of the transistor 511. As a result, the amplifier circuit 510 outputs the drive signal COM the voltage value of which increases toward the potential Vh. Also, in the period Tu in which the leakage current is generated in the drive circuit 50, as in the period Tu in which the leakage current is not generated in the drive circuit 50, the leakage current detection circuit 70 generates the detection voltage Vleak with the potential Vh and outputs the detection voltage Vleak to the determination circuit 101.

In the period Td in which the leakage current is generated in the drive circuit 50, as in the period Td in which the leakage current is not generated in the drive circuit 50, the amplification control circuit 500 outputs a L-level amplification control signal Hdr and a L-level amplification control signal Ldr. Accordingly, the transistor 511 is controlled such that the collector terminal and the emitter terminal of the transistor 511 are electrically disconnected from each other, and the transistor 512 is controlled such that the emitter terminal and the collector terminal of the transistor 512 are electrically connected to each other. As a result, the amplifier circuit 510 outputs the drive signal COM the voltage value of which decreases toward the ground potential Gnd.

Also, in the period Td in which the leakage current is generated in the drive circuit 50, as in the period Td in which the leakage current is not generated in the drive circuit 50, the control circuit 100 generates the detection control signal Lck for controlling the switch circuit 710 such that one end and the other end of the switch circuit 710 are electrically disconnected from each other and outputs the detection control signal Lck to the leakage current detection circuit 70. Accordingly, the leakage current detection circuit 70 outputs the voltage signal VHV passed through the resistance element 720 as the voltage signal Vamp. As a result, the voltage signal VHV passed through the resistance element 720 is supplied to the collector terminal of the transistor 511 as the voltage signal Vamp.

In this case, in the example shown in FIG. 13, because the leakage current is generated in the drive circuit 50, the leakage current flows between the collector terminal and the emitter terminal of the transistor 511 that is controlled to be non-conductive. Therefore, a voltage drop ΔV occurs at the ends of the resistance element 720 due to the resistance element 720 and the leakage current generated in the transistor 511. Accordingly, the leakage current detection circuit 70 outputs the voltage signal Vamp with a potential Vl that has decreased from the voltage signal VHV by the voltage drop ΔV. That is, the voltage signal Vamp with the potential Vl, which has decreased by the voltage drop ΔV from the voltage signal VHV, is supplied to the collector terminal of the transistor 511. Accordingly, in the period Td in which the leakage current is generated in the drive circuit 50, the leakage current detection circuit 70 generates the detection voltage Vleak with the potential Vl lower than the potential Vh and outputs the detection voltage Vleak to the determination circuit 101.

In the period Tc in which the leakage current is generated in the drive circuit 50, as in the period Tc in which the leakage current is not generated in the drive circuit 50, the amplification control circuit 500 outputs a L-level amplification control signal Hdr and a H-level amplification control signal Ldr. Accordingly, the transistor 511 is controlled such that the collector terminal and the emitter terminal of the transistor 511 are electrically disconnected from each other, and the transistor 512 is controlled such that the emitter terminal and the collector terminal of the transistor 512 are electrically disconnected from each other. As a result, the amplifier circuit 510 outputs a constant drive signal COM with an immediately-preceding voltage value.

Also, in the period Tc in which the leakage current is generated in the drive circuit 50, as in the period Tc in which the leakage current is not generated in the drive circuit 50, the control circuit 100 generates the detection control signal Lck for controlling the switch circuit 710 such that one end and the other end of the switch circuit 710 are electrically disconnected from each other and outputs the detection control signal Lck to the leakage current detection circuit 70. Accordingly, the leakage current detection circuit 70 outputs the voltage signal VHV passed through the resistance element 720 as the voltage signal Vamp. As a result, the voltage signal VHV passed through the resistance element 720 is supplied to the collector terminal of the transistor 511 as the voltage signal Vamp.

In this case, in the example shown in FIG. 13, because the leakage current is generated in the drive circuit 50, the leakage current flows between the collector terminal and the emitter terminal of the transistor 511 that is controlled to be non-conductive. Therefore, the voltage drop ΔV occurs at the ends of the resistance element 720 due to the resistance element 720 and the leakage current generated in the transistor 511. Accordingly, the leakage current detection circuit 70 outputs the voltage signal Vamp with the potential Vl that has decreased from the voltage signal VHV by the voltage drop ΔV. That is, the voltage signal Vamp with the potential Vl, which has decreased by the voltage drop ΔV from the voltage signal VHV, is supplied to the collector terminal of the transistor 511. Accordingly, in the period Tc in which the leakage current is generated in the drive circuit 50, the leakage current detection circuit 70 generates the detection voltage Vleak with the potential Vl lower than the potential Vh and outputs the detection voltage Vleak to the determination circuit 101.

As described above, in the liquid ejecting apparatus 1 of the present embodiment, the control circuit 100 controls the switch circuit 710 of the leakage current detection circuit 70 to be non-conductive in the periods Tc and Td in which the transistor 511 is controlled such that the collector terminal and the emitter terminal of the transistor 511 are electrically disconnected from each other. That is, one end and the other end of the switch circuit 710 are electrically disconnected from each other when the transistor 511 is controlled to be non-conductive. As a result, the voltage signal VHV passes through the resistance element 720 and is supplied to the collector terminal of the transistor 511.

The determination circuit 101 determines whether the leakage current is generated in the drive circuit 50 based on the potential of the detection voltage Vleak that is input when the transistor 511 is controlled to be non-conductive. That is, the leakage current detection circuit 70 detects the leakage current in the drive circuit 50 when the transistor 511 is controlled to be non-conductive, and the determination circuit 101 determines whether the leakage current is generated in the drive circuit 50 based on a detection result of the leakage current detection circuit 70 obtained while the transistor 511 is controlled to be non-conductive.

Specifically, when the switch circuit 710 is controlled such that one end and the other end of the switch circuit 710 are electrically disconnected from each other, the voltage signal VHV passes through the resistance element 720 and is supplied to the collector terminal of the transistor 511. In this case, the voltage drop ΔV occurs at the ends of the resistance element 720 due to an electric current flowing between the collector terminal and the emitter terminal of the transistor 511. That is, when the leakage current is not generated in the transistor 511, no electric current flows to the resistance element 720 during a period in which the transistor 511 is controlled to be non-conductive, and as a result, the voltage drop ΔV does not occur at the ends of the resistance element 720. In contrast, when the leakage current is generated in the transistor 511, the leakage current flows to the resistance element 720 even in a period during which the transistor 511 is controlled to be non-conductive, and as a result, the voltage drop ΔV corresponding to the amount of the leakage current occurs at the ends of the resistance element 720. The leakage current detection circuit 70 generates the detection voltage Vleak with a potential lower than the potential Vh of the voltage signal VHV by the voltage drop ΔV that has occurred at the ends of the resistance element 720 in a period in which the transistor 511 is controlled to be non-conductive, and outputs the detection voltage Vleak to the determination circuit 101.

The determination circuit 101 calculates the amount of current flowing into the drive circuit 50 based on a potential difference between the potential Vl of the received detection voltage Vleak and the potential Vh of the voltage signal VHV and the resistance value of the resistance element 720, and determines whether the leakage current is generated in the drive circuit 50 based on whether the calculated amount of current is greater than or equal to the predetermined threshold. Then, the determination circuit 101 causes the drive circuit 50 to stop outputting the drive signal COM or cause the voltage output circuit 110 to stop outputting the voltage signal VHV when the calculated amount of current is greater than or equal to the predetermined threshold, i.e., when it is determined that the leakage current is generated in the drive circuit 50. With this configuration, the leakage current detection circuit 70 can detect the leakage current that may be generated in the drive circuit 50. This in turn makes it possible to reduce the probability that various electronic components of the drive circuit 50 unintendedly generate heat due to the leakage current and also reduce the probability that the operational stability of the drive circuit 50 and the liquid ejecting apparatus 1 is reduced due to the generation of heat.

Here, the drive signal COM and the drive signal VOUT based on the drive signal COM are examples of drive signals, the transistor 511 of the drive circuit 50 is an example of a first transistor, the transistor 512 is an example of a second transistor, the voltage signal Vamp output by the leakage current detection circuit 70 and input to the collector terminal of the transistor 511 is an example of an amplification voltage, and a wiring pattern that electrically connects the leakage current detection circuit 70 to the drive circuit 50 and through which the voltage signal Vamp output by the leakage current detection circuit 70 is transmitted is an example of a transmission path.

6. Effects

As described above, the liquid ejecting apparatus 1 of the present embodiment includes the piezoelectric element 60 that is driven by the drive signal VOUT based on the drive signal COM; the ejection head 20 that ejects ink when the piezoelectric element 60 is driven; the drive circuit 50 that outputs the drive signal COM, the drive circuit 50 including the amplifier circuit 510 that includes the transistors 511 and 512 and amplifies, based on the voltage signal Vamp and through the operations of the transistors 511 and 512, the base drive signal dA based on which the drive signal COM is generated; and the leakage current detection circuit 70 that detects the leakage current in the drive circuit 50. The leakage current detection circuit 70 is electrically connected to the transistor 511 included in the amplifier circuit 510 to which the voltage signal Vamp is supplied. That is, the leakage current detection circuit 70 detects the leakage current that may be generated in the drive circuit 50 due to the voltage signal Vamp used as an amplification voltage for generating the drive signal COM in the drive circuit 50.

With the above configuration, the liquid ejecting apparatus 1 of the present embodiment can accurately detect whether the leakage current is generated in the drive circuit 50 due to the voltage signal Vamp. This in turn makes it possible to reduce the probability that various electronic components of the drive circuit 50 unintendedly generate heat due to the leakage current and also reduce the probability that the operational stability of the drive circuit 50 and the liquid ejecting apparatus 1 is reduced due to the generation of heat.

Particularly, because the voltage signal Vamp is a high voltage signal used to generate the drive signal COM, it is highly probable that the leakage current is generated in the drive circuit 50 due to the voltage signal Vamp. Also, when the leakage current is generated in the drive circuit 50 due to the voltage signal Vamp, the amount of heat generated in the drive circuit 50 may become large. With the leakage current detection circuit 70 that detects, in a path through which the voltage signal Vamp is transmitted, whether the leakage current is generated in the drive circuit 50, it is possible to efficiently reduce the probability that various electronic components of the drive circuit 50 unintendedly generate heat due to the leakage current and to also efficiently reduce the probability that the operational stability of the drive circuit 50 and the liquid ejecting apparatus 1 is reduced due to the generation of heat.

Also, considering that the drive signal COM output by the drive circuit 50 is a signal amplified based on the voltage signal Vamp and that the drive signal VOUT based on the drive signal COM is supplied to the electrode 611 of the piezoelectric element 60, if the leakage current is generated in the transistor 511, it is probable that a signal with an unintended voltage value is supplied to the electrode 611 of the piezoelectric element 60 due to the leakage current. Such a signal having an unintended voltage value and supplied to the piezoelectric element 60 may affect the drive characteristics of the piezoelectric element 60. This in turn may affect ink ejection characteristics of the ejection head 20, may apply unintended stress on the piezoelectric element 60, and may form a crack in the piezoelectric element 60.

In view of the above problems, the leakage current detection circuit 70 is provided to detect, in a path through which the voltage signal Vamp is transmitted, whether the leakage current is generated in the drive circuit 50. This makes it possible to reduce the probability that a signal with an unintended voltage value is supplied to the piezoelectric element 60 due to the leakage current, thereby reduce the probability that the ink ejection characteristics of the ejection head 20 are degraded, and also reduce the probability that a crack is formed in the piezoelectric element 60.

Furthermore, the leakage current detection circuit 70 includes the switch circuit 710 and the resistance element 720 and detects the leakage current generated in the drive circuit 50 when the transistor 511 is controlled such that the collector terminal and the emitter terminal of the transistor 511 are electrically disconnected from each other and the switch circuit 710 is controlled such that one end and the other end of the switch circuit 710 are electrically disconnected from each other. This configuration reduces the probability that the operation of the leakage current detection circuit 70 affects the waveform of the drive signal COM output by the drive circuit 50, improves the waveform accuracy of the drive signal COM, and improves the accuracy of ink ejection from the ejection head 20.

7. Second Embodiment

Next, a liquid ejecting apparatus 1 according to a second embodiment is described. In describing the liquid ejecting apparatus 1 of the second embodiment, the same reference numbers assigned to components of the liquid ejecting apparatus 1 of the first embodiment are assigned to the corresponding components of the liquid ejecting apparatus 1 of the second embodiment, and the descriptions of those components are omitted or simplified.

Figure 14:
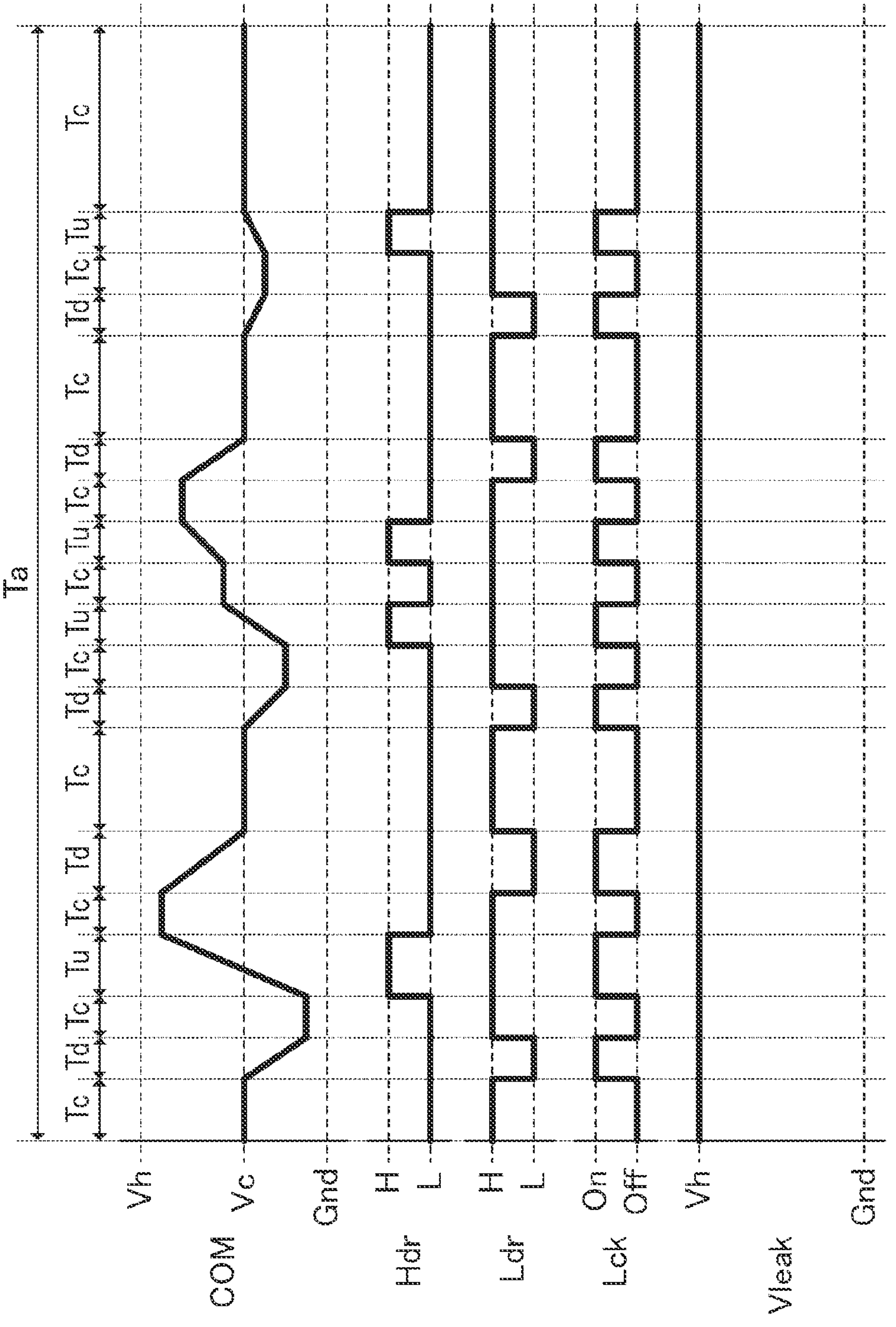
FIG. 14 is a timing chart for describing an example of an operation of a leakage current detection circuit of a liquid ejecting apparatus according to a second embodiment in a case in which no leakage current is generated in a drive circuit.
Figure 15:
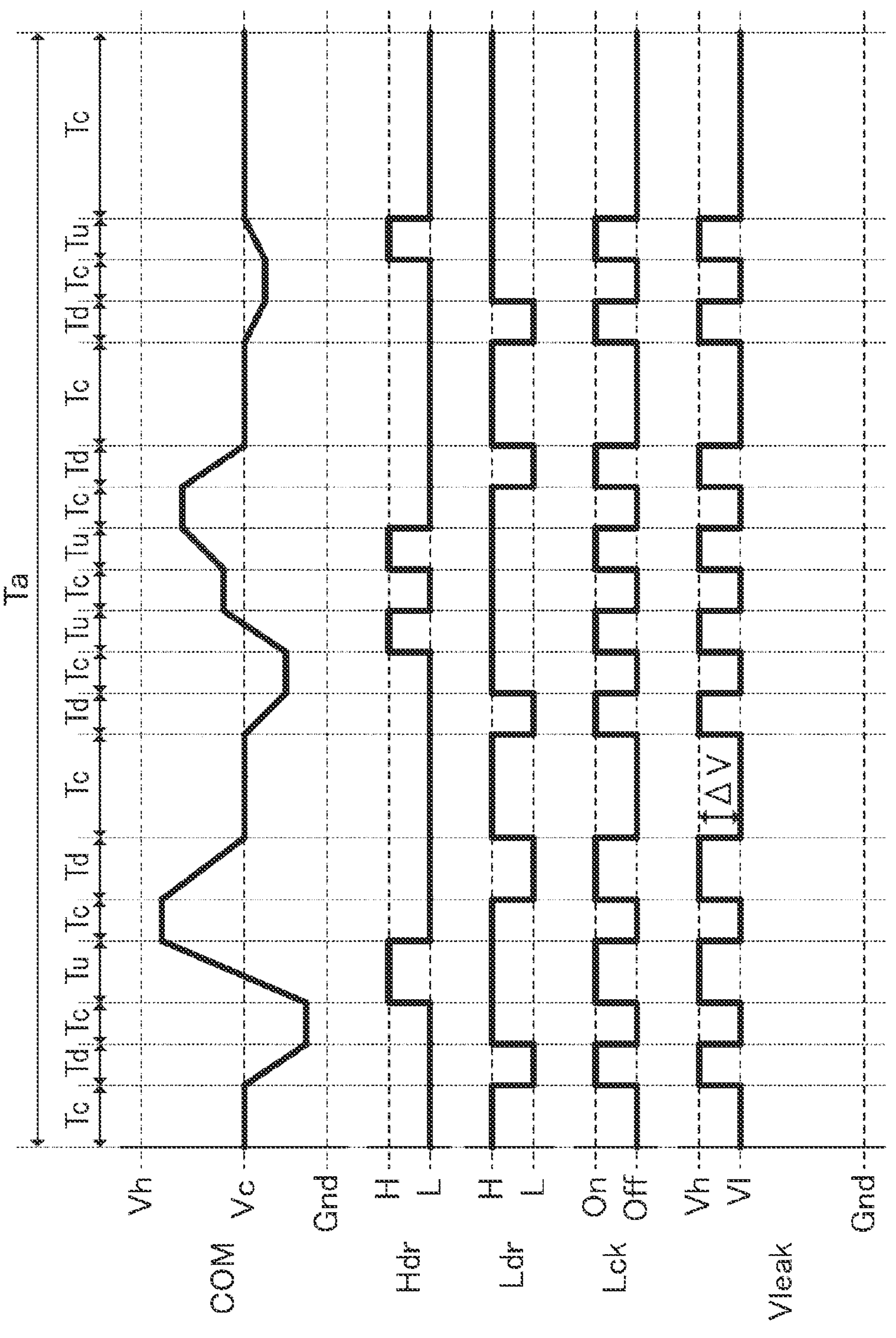
FIG. 15 is a timing chart for describing an example of an operation of the leakage current detection circuit of the liquid ejecting apparatus according to the second embodiment in a case in which a leakage current is generated in the drive circuit.

FIG. 14 is a timing chart for describing an example of an operation of the leakage current detection circuit 70 of the liquid ejecting apparatus 1 of the second embodiment in a case in which no leakage current is generated in the drive circuit 50. FIG. 15 is a timing chart for describing an example of an operation of the leakage current detection circuit 70 of the liquid ejecting apparatus 1 of the second embodiment in a case in which a leakage current is generated in the drive circuit 50. As shown in FIGS. 14 and 15, the liquid ejecting apparatus 1 of the second embodiment differs from the liquid ejecting apparatus 1 of the first embodiment in that the control circuit 100 generates the detection control signal Lck for controlling the switch circuit 710 such that one end and the other end of the switch circuit 710 are electrically connected to each other and outputs the detection control signal Lck to the leakage current detection circuit 70 in the period Td in which the voltage value of the drive signal COM output by the drive circuit 50 decreases.

That is, in the liquid ejecting apparatus 1 of the second embodiment, the leakage current detection circuit 70 detects the leakage current that may be generated in the drive circuit 50 when the transistor 511 is controlled to be non-conductive and the transistor 512 is controlled to be non-conductive.

The liquid ejecting apparatus 1 of the second embodiment configured as described above can provide advantageous effects similar to those provided by the first embodiment, and the leakage current detection circuit 70 can detect the leakage current, which may be generated in the drive circuit 50, in the period Tc in which the voltage value of the drive signal COM is constant. This reduces the provability that the variation of the voltage value of the voltage signal VHV, which may vary according to the operations of the transistors 511 and 512, affects the detection of the leakage current, which may be generated in the drive circuit 50, by the leakage current detection circuit 70 and further improves the detection accuracy of the leakage current that may be generated in the drive circuit 50.

8. Variations

In the liquid ejecting apparatus 1 of the first embodiment and the liquid ejecting apparatus 1 of the second embodiment described above, it is assumed that the drive circuit 50 includes a class B amplifier circuit or a class AB amplifier circuit that amplifies a signal corresponding to the base drive signal dA through the operations of the transistors 511 and 512. However, the drive circuit 50 is not limited to a class B amplifier circuit or a class AB amplifier circuit, but may also be, for example, a class A amplifier circuit or a class D amplifier circuit.

However, in view of reducing the power consumption of the liquid ejecting apparatus 1 and improving the waveform accuracy of the drive signal COM, the drive circuit 50 is preferably implemented by a class AB amplifier circuit or a class D amplifier circuit. Here, when a class D amplifier circuit, in which a switching element corresponding to the transistor 511 operates at a high frequency, is used in a configuration in which the leakage current detection circuit 70 detects the leakage current, which may be generated in the drive circuit 50, in a period in which the transistor 511 is non-conductive, the number of operations of the switch circuit 710 may increase and as a result, heat generation in the switch circuit 710 may increase. For this reason, the drive circuit 50 is preferably implemented by a class AB amplifier circuit as described in the above embodiments.

That is, although the drive circuit 50 may be implemented by any of a class A amplifier circuit, a class B amplifier circuit, a class AB amplifier circuit, and a class D amplifier circuit, the drive circuit 50 is particularly preferably implemented by a class AB amplifier circuit.

Also, in the liquid ejecting apparatus 1 of the first embodiment and the liquid ejecting apparatus 1 of the second embodiment described above, the determination circuit 101 calculates the amount of the leakage current that may be generated in the drive circuit 50 by comparing the potential Vh of the predetermined voltage signal VHV with the potential Vl of the detection voltage Vleak input from the leakage current detection circuit 70. Alternatively, the determination circuit 101 may be configured to receive both of the voltage signal VHV and the detection voltage Vleak and to calculate the amount of the leakage current that may be generated in the drive circuit 50 by comparing the potential Vh of the received voltage signal VHV and the potential Vl of the received detection voltage Vleak.

The embodiments and variations of the present disclosure are described above. However, the present disclosure is not limited to the above-described embodiments and variations and may be implemented in various manners without departing from the spirit of the present disclosure. For example, the above embodiments may be combined in any appropriate manner.

The present disclosure includes configurations that are substantially the same as the configurations described in the embodiments (e.g., a configuration the functions, methods, and results of which are the same as those of the above embodiments, or a configuration the purpose and effects of which are the same as those of the above embodiments). Also, the present disclosure includes a configuration obtained by replacing non-essential components of a configuration described in the embodiments. Also, the present disclosure includes a configuration that can provide the same effect or achieve the same purpose as that provided or achieved by a configuration described in the embodiments. Furthermore, the present disclosure includes a configuration obtained by adding a known technology to a configuration described in the embodiments.

The following configurations may be derived from the embodiments described above.

A liquid ejecting apparatus according to an embodiment includes a driven element that is driven by a drive signal; an ejection head that ejects a liquid when the driven element is driven; a drive circuit that outputs the drive signal, the drive circuit including an amplifier circuit that includes a first transistor and amplifies, based on an amplification voltage and through an operation of the first transistor, a base drive signal based on which the drive signal is generated; and a leakage current detection circuit that detects a leakage current in the drive circuit. The leakage current detection circuit is electrically connected to the first transistor included in the amplifier circuit to which the amplification voltage is supplied.

According to this liquid ejecting apparatus, the leakage current detection circuit for detecting the leakage current in the drive circuit is electrically connected to the first transistor included in the amplifier circuit that is included in the drive circuit and amplifies, based on the amplification voltage, the base drive signal based on which the drive signal is generated. With this configuration, the leakage current detection circuit can detect, based on the amplification voltage that is a high voltage, the leakage current that may be generated in the drive circuit. This in turn makes it possible to efficiently reduce the probability that various electronic components of the drive circuit unintendedly generate heat due to the leakage current generated in the drive circuit and to also efficiently reduce the probability that the operational stability of the drive circuit and the liquid ejecting apparatus is reduced due to the generation of heat.

In the liquid ejecting apparatus according to the embodiment, the amplification voltage may be supplied to one end of the first transistor, and the leakage current detection circuit may detect the leakage current when the first transistor is controlled to be non-conductive.

In the liquid ejecting apparatus according to the embodiment, the amplifier circuit may include a second transistor including one end that is electrically connected to the first transistor and another end to which a ground potential is supplied, and the leakage current detection circuit may detect the leakage current when the first transistor is controlled to be non-conductive and the second transistor is controlled to be non-conductive.

According to this liquid ejecting apparatus, the leakage current detection circuit detects the leakage current that may be generated in the drive circuit in a period in which both of the first transistor and the second transistor of the drive circuit are controlled to be non-conductive. This makes it possible to reduce the probability that the operations of the first transistor and the second transistor affect the leakage current detection circuit. As a result, the accuracy of detecting the leakage current, which may be generated in the drive circuit, by the leakage current detection circuit is improved.

In the liquid ejecting apparatus according to the embodiment, the leakage current detection circuit may include a switch circuit and a resistance element, one end of the switch circuit may be electrically connected to one end of the resistance element, and another end of the switch circuit and another end of the resistance element may be electrically connected to the first transistor.

In the liquid ejecting apparatus according to the embodiment, the switch circuit may be controlled such that one end and the other end of the switch circuit are electrically disconnected from each other when the first transistor is controlled to be non-conductive.

The liquid ejecting apparatus according to the embodiment may further include a determination circuit that determines whether the amount of the leakage current is greater than or equal to a predetermined threshold, and the determination circuit may determine whether the leakage current is present based on a voltage value of a transmission path through which the amplification voltage is transmitted.

In the liquid ejecting apparatus according to the embodiment, the first transistor may be controlled to be non-conductive when the determination circuit determines that the amount of the leakage current is greater than or equal to the predetermined threshold.

According to this liquid ejecting apparatus, the operation of the drive circuit can be stopped when the leakage current generated in the drive circuit is greater than or equal to a predetermined current value. This makes it possible to further improve the operational stability of the drive circuit and the liquid ejecting apparatus.

What is claimed is:

1. A liquid ejecting apparatus comprising:

a driven element that is driven by a drive signal;

an ejection head that ejects a liquid when the driven element is driven;

a drive circuit that outputs the drive signal, the drive circuit including an amplifier circuit that includes a first transistor and amplifies, based on an amplification voltage and through an operation of the first transistor, a base drive signal based on which the drive signal is generated; and a leakage current detection circuit that detects a leakage current in the drive circuit, wherein the leakage current detection circuit is electrically connected to the first transistor included in the amplifier circuit to which the amplification voltage is supplied, the amplification voltage is supplied to one end of the first transistor, and the leakage current detection circuit detects the leakage current when the first transistor is controlled to be non-conductive.

2. The liquid ejecting apparatus according to claim 1, wherein the amplifier circuit includes a second transistor including one end that is electrically connected to the first transistor and another end to which a ground potential is supplied; and the leakage current detection circuit detects the leakage current when the first transistor is controlled to be non-conductive and the second transistor is controlled to be non- conductive.

3. The liquid ejecting apparatus according to claim 1, wherein the leakage current detection circuit includes a switch circuit and a resistance element;

one end of the switch circuit is electrically connected to one end of the resistance element; and another end of the switch circuit and another end of the resistance element are electrically connected to the first transistor.

4. The liquid ejecting apparatus according to claim 3, wherein the switch circuit is controlled such that the one end and the another end of the switch circuit are electrically disconnected from each other when the first transistor is controlled to be non-conductive.

5. The liquid ejecting apparatus according to claim 1, further comprising:

a determination circuit that determines whether an amount of the leakage current is greater than or equal to a predetermined threshold, wherein the determination circuit determines whether the leakage current is present based on a voltage value of a transmission path through which the amplification voltage is transmitted.

6. The liquid ejecting apparatus according to claim 5, wherein the first transistor is controlled to be non-conductive when the determination circuit determines that the amount of the leakage current is greater than or equal to the predetermined threshold.

7. A liquid ejecting apparatus comprising:

a driven element that is driven by a drive signal;

an ejection head that ejects a liquid when the driven element is driven;

a drive circuit that outputs the drive signal, the drive circuit including an amplifier circuit that includes a first transistor and amplifies, based on an amplification voltage and through an operation of the first transistor, a base drive signal based on which the drive signal is generated; and a leakage current detection circuit that detects a leakage current in the drive circuit, wherein p1 the leakage current detection circuit is electrically connected to the first transistor included in the amplifier circuit to which the amplification voltage is supplied, the leakage current detection circuit includes a switch circuit and a resistance element, one end of the switch circuit is electrically connected to one end of the resistance element, another end of the switch circuit and another end of the resistance element are electrically connected to the first transistor, and the switch circuit is controlled such that the one end and the another end of the switch circuit are electrically disconnected from each other when the first transistor is controlled to be non-conductive.

8. A liquid ejecting apparatus comprising:

a driven element that is driven by a drive signal;

an ejection head that ejects a liquid when the driven element is driven;

a drive circuit that outputs the drive signal, the drive circuit including an amplifier circuit that includes a first transistor and amplifies, based on an amplification voltage and through an operation of the first transistor, a base drive signal based on which the drive signal is generated;

a leakage current detection circuit that detects a leakage current in the drive circuit; and a determination circuit that determines whether an amount of the leakage current is greater than or equal to a predetermined threshold, wherein the leakage current detection circuit is electrically connected to the first transistor included in the amplifier circuit to which the amplification voltage is supplied, the determination circuit determines whether the leakage current is present based on a voltage value of a transmission path through which the amplification voltage is transmitted, and the first transistor is controlled to be non-conductive when the determination circuit determines that the amount of the leakage current is greater than or equal to the predetermined threshold.

* * * * *